(12) United States Patent
Elia

(10) Patent No.: US 11,938,426 B2
(45) Date of Patent: Mar. 26, 2024

(54) FILTERING APPARATUS AND METHOD

(71) Applicant: O.M.IT S.R.L., Pomezia (IT)

(72) Inventor: Carmine Elia, Pomezia (IT)

(73) Assignee: O.M.IT S.R.L. (IT)

( * ) Notice: Subject to any disclaimer, the term of this patent is extended or adjusted under 35 U.S.C. 154(b) by 0 days.

(21) Appl. No.: 17/293,101

(22) PCT Filed: Sep. 17, 2019

(86) PCT No.: PCT/EP2019/074913
§ 371 (c)(1),
(2) Date: May 12, 2021

(87) PCT Pub. No.: WO2020/098997
PCT Pub. Date: May 22, 2020

(65) Prior Publication Data
US 2021/0402334 A1 Dec. 30, 2021

(30) Foreign Application Priority Data

Nov. 12, 2018 (IT) .................... 102018000010259
Nov. 19, 2018 (IT) .................... 102018000010430
(Continued)

(51) Int. Cl.
*B01D 33/21* (2006.01)
*B01D 33/46* (2006.01)
(Continued)

(52) U.S. Cl.
CPC ......... *B01D 33/215* (2013.01); *B01D 33/463* (2013.01); *B01D 33/50* (2013.01);
(Continued)

(58) Field of Classification Search
CPC .... B01D 33/15; B01D 33/215; B01D 33/463; B01D 33/50; B01D 33/807; B01D 2201/184; B01D 2201/54
See application file for complete search history.

(56) References Cited

U.S. PATENT DOCUMENTS 4,639,315 A     1/1987 Fuchs et al.
5,296,143 A *   3/1994 Frykhult ............. B01D 29/014
                                              210/331
(Continued)

FOREIGN PATENT DOCUMENTS

CN       101961574 A      2/2011
CN       102 039 067 B    9/2012
(Continued)

OTHER PUBLICATIONS

International Search Report, International Application No. PCT/EP2019/074913, filed Sep. 17, 2019, dated Nov. 29, 2019, 4 pages.
(Continued)

*Primary Examiner* — Patrick Orme
(74) *Attorney, Agent, or Firm* — Ware, Fressola, Maguire & Barber LLP

(57) ABSTRACT

A liquid (2), such as wastewater, is filtered using a liquid-permeable filtering element (9) having first and second faces (10, 11) so as to produce filtered liquid (4) having total suspended solids of no more than 10 mg/L. The method comprises cycling the liquid-permeable filtering element through the liquid whereby, in a first position, an area of the first face of the filtering element is subjected to liquid under pressure and a pressure across the filtering element is greater than 0 and less than or equal to 5.9 kPa (60 cm $H_2O$), and, in a second position, the area is not subjected to liquid under pressure or is subjected to liquid at a lower pressure, and solids accumulated on the first face of the filtering element
(Continued)

can be removed by directing at least one jet at the second face of the filtering element through the filtering element towards the first face.

23 Claims, 32 Drawing Sheets

(30) Foreign Application Priority Data

Jul. 5, 2019 (IT) .......................... 102019000011046
Jul. 5, 2019 (IT) .......................... 102019000011058

(51) Int. Cl.
*B01D 33/50* (2006.01)
*B01D 33/80* (2006.01)

(52) U.S. Cl.
CPC ...... *B01D 33/807* (2013.01); *B01D 2201/184* (2013.01); *B01D 2201/54* (2013.01)

(56) References Cited

U.S. PATENT DOCUMENTS

| 5,759,397 | A | 6/1998 | Larsson et al. | |
|---|---|---|---|---|
| 9,649,584 | B2 | 5/2017 | Burns et al. | |
| 2009/0159523 | A1* | 6/2009 | McCutchen | C02F 1/001 |
| | | | | 210/360.1 |
| 2011/0220586 | A1* | 9/2011 | Levitt | B01D 29/606 |
| | | | | 210/741 |
| 2012/0285867 | A1 | 11/2012 | Schmidt | |
| 2017/0043284 | A1* | 2/2017 | Petit | B01D 33/23 |

FOREIGN PATENT DOCUMENTS

| EP | 2 514 500 A1 | 10/2012 |
|---|---|---|
| JP | 2002-273261 A | 9/2002 |
| JP | 2016-159241 A | 9/2016 |
| KR | 10-2006-0005533 A | 1/2006 |
| WO | 91/12064 A1 | 8/1991 |
| WO | 2008/002240 A1 | 1/2008 |
| WO | 2009/011864 A1 | 1/2009 |
| WO | 2014/170533 A1 | 10/2014 |

OTHER PUBLICATIONS

Written Opinion of the International Search Authority, International Application No. PCT/EP2019/074913, dated Nov. 29, 2019, 6 pages.
International Preliminary Report on Patentability, completed Jul. 23, 2020, 23 pages.
Search Report from the Ministry of Economic Development for Italian Application No. IT201800010430, Report dated Jul. 10, 2019 with "Item V" at pp. 8-10 in English (concerning novelty and inventive step), 10 pages.
Search Report from the Ministry of Economic Development for Italian Application No. IT201800010259, Report dated Jul. 4, 2019 with "Item V" at pp. 8-9 in English (concerning novelty and inventive step), 9 pages.
Machine translation of Foreign Patent Document Cite No. 1, JP2002273261, 28 pages.
Machine translation of Foreign Patent Document Cite No. 2, JP2016159241, 18 pages.
Egyptian Office Action for counterpart Egyptian application, 6 pages.

* cited by examiner

FILTERING APPARATUS AND METHOD

FIELD

The present invention relates to a filtering a liquid, such as wastewater, to obtain a filtered fluid and/or to thicken the liquid or to recover solid content.

The present invention also relates to apparatus for filtering a liquid, such as wastewater, to obtain a filtered fluid and/or to thicken the liquid or to recover solid content.

BACKGROUND

Filtering of a liquid, in particular a suspension containing suspended solids, can be used in a number of different applications including municipal, industrial and agricultural wastewater treatments processes. In some cases, such as in municipal wastewater treatment, filtering can be used to obtain a filtered liquid having a lower suspended solid content. In other cases, however, filtering can be used to thicken the liquid or to recover solid content (such as fibres or debris).

One form of filter is a rotating disc filter. Examples of rotating disc filters can be found in U.S. Pat. Nos. 5,759,397 A, 4,639,315 A and 5,296,143 A. Rotating disc filters can achieve high fluxes, can be operated continuously for long periods of time and generally tend to be resistant to clogging. However, rotating disc filters tend to use filter cloths with larger pore sizes and so sacrifice the degree of filtering.

Another form of filter is a membrane bioreactor. Membrane bioreactors tend to have a much smaller effective pore size. A smaller pore size helps increase the degree of filtering, this comes at the expense of flux (several orders of magnitude lower than rotating disc filters) and a tendency for the membrane to clog. Thus, membrane bioreactors tend to be used in low-flux, specialised applications.

SUMMARY

According to a first aspect of the present invention there is provided apparatus for filtering a liquid. The apparatus comprises a liquid-permeable filtering element having first and second faces, the liquid-permeable filtering element to be at least partially submerged in a liquid, the liquid-permeable filtering element arranged to be cycled through the liquid such that, in a first position, an area of the first face of the filtering element is subject to liquid under pressure and a pressure across the filtering element is between 0 and 5.9 kPa (60 cm $H_2O$) and, in a second position, the area is not subjected to liquid under pressure or is subjected to liquid at a lower pressure. The apparatus comprises at least one nozzle for directing at least one jet from the second side of the filtering element through the filtering element towards the first side of the layer for removing and/or aiding removal of solids accumulated on the first face of the filtering element. The filtering machine is configured to filter liquid having total suspended solids of between 1 and 50 g/L so as to produce filtered liquid having total suspended solids of no more than 10 mg/L. The filtering element has a pore size and the filtering element is configured to be cycled at a speed such that such that permeation flux is between 200 L/($m^2$h) to 5,000 L/($m^2$h) and a thickness of a layer of accumulated solids when the filtering element reaches the second position is between 0 and 6 cm.

The liquid-permeable filtering element may be arranged to be cycled through the liquid such that, in the first position, the area of the first face of the filtering element is subject to liquid under pressure and the pressure across the filtering element is between 0 and 3.9 kPa (40 cm$H_2O$). The filtering machine may be configured to filter liquid having total suspended solids of between 15 and 40 g/L, for example between 20 and 40 g/L. The pore size may be between 2 and 40 µm. The pore size may be between 15 to 25 µm. The thickness of accumulated solids when the filtering element reaches the second position may be between 0 and 2 cm. The speed may be 0.25 to 30 m/min. The filtering element may be configured to be cycled at between 0 and 1.047 rad/s (10 rpm), between 0 and 0.21 rad/s (2 rpm) or between 0 and 0.105 rad/s (1 rpm). The permeation flux may be configured to be between 1,000 L/($m^2$h) to 5,000 L/($m^2$h), for example, between 2,000 L/($m^2$h) to 5,000 L/($m^2$h). The liquid-permeable filtering element may include pores having a range of different pore sizes, the pore sizes being between 2 and 40 µm. The liquid-permeable filtering element may comprise a mesh. The liquid-permeable filtering element may comprise a polymer, for example, polyester, polyethylene, PTFE, or nylon. The liquid-permeable filtering element may comprise a metal, such as stainless steel. The apparatus may be configured such that the accumulated solids are removed periodically. The apparatus may be configured such that the accumulated solids are removed every cycle. The period may be between 10 to 1000 s. The apparatus may be configured such that, in the second position, the area is above the liquid.

The apparatus may further comprise a container for a liquid up to a level for operation. The apparatus may further comprise gas feeder(s) for introducing gas bubbles into the liquid. The apparatus may further comprise liquid in the container up to the level. The apparatus may further comprise a control system for arranging a height difference between the liquid and the filtered liquid across the filtering element so as to control the pressure difference across the filtering element. The control system may comprise a computer system, at least one valve and/or at least one pump controllable by the computer system to control egress of filtered liquid from a reservoir. The apparatus may comprise a reservoir for receiving the filtered water, the reservoir comprising a weir having a bottom and a top and first height, h, between the bottom and top, the weir dividing the reservoir into first and second portions, an ingress for providing filtered to water to the first portion of the reservoir and an egress for receiving filter water, the egress provided at a second height between the bottom and top of the weir.

The liquid may be wastewater.

The apparatus may comprise a structure having a plurality of discs coaxially spaced apart from one another, each disc carrying a plurality of facing pairs of filter sectors, communicating with a central inner space, and being closed by an outer cylindrical sleeve. The structure may comprise two circular end plates, each of which is provided centrally with an opening for a rotatable support, a plurality of cylindrical portions, each of which spaces apart two discs adjacent to it and delimits, for its part, said central inner space, a plurality of longitudinal members made of modular components in the form of a square wave, connected at their respective ends to the two circular end plates. Each modular component in square wave form may have a square wave with a wave trough fixed to the respective cylindrical portion of said plurality of cylindrical portions, a rising wave edge and a falling wave edge for supporting the consecutive filter sectors, and a wave crest that interacts with the other wave crests which are equidistant from one or other circular end plate, for supporting said outer cylindrical sleeve.

According to a second aspect of the present invention there is provided a structure for rotating disc filter, having a plurality of discs coaxially spaced apart from one another, each disc carrying a multiplicity of facing pairs of filter sectors, communicating with a central inner space, and being closed by an outer cylindrical sleeve. The structure may comprise two circular end plates, each of which is provided centrally with an opening for a rotatable support, a plurality of cylindrical portions, each of which spaces apart two discs adjacent to it and delimits, for its part, said central inner space, a plurality of longitudinal members made of modular components in the form of a square wave, connected at their respective ends to the two circular end plates. Each modular component in square wave form may have a square wave with a wave trough fixed to the respective cylindrical portion of said plurality of cylindrical portions, a rising wave edge and a falling wave edge for supporting the consecutive filter sectors, and a wave crest that interacts with the other wave crests which are equidistant from one or other circular end plate, for supporting said outer cylindrical sleeve.

Each square wave may be a U-shaped element, to the rising wave edge and falling wave edge of which supporting guides having a U-shaped cross section are butt-welded, for receiving and supporting facing filter sectors. The apparatus or structure may comprise a pair of rings comprising a proximal ring and a distal ring, spaced apart from one another, are mounted on each side of said cylindrical portion to support the lower ends of said supporting guides, the proximal ring in contact with the cylindrical portion being provided with angularly equidistant indentations. The wave trough may have a pair of indentations coaxial with the rising wave edge and the falling wave edge, designed to engage with a pair of angularly equidistant said indentations on the proximal ring in contact with the inner cylindrical portion. The U-shaped element may have a wave crest adapted for connection to a consecutive U-shaped element, the wave crest supporting opposed plates for supporting a portion of outer cylindrical sleeve.

The apparatus may comprise a filter which is meant to be partially immersed in a liquid to be filtered to obtain a filtered liquid. The filter may comprise a structure supporting filter sectors, the filter sectors arranged to separate an external region containing the liquid to be filtered from an inner space containing the filtered liquid, wherein the filtered liquid is maintained at a lower level than the level, L, of the liquid to be filtered (resulting in a pressure difference across the filter), wherein the support structure, is rotatably mounted around an axis on external supports and has at least one passage to allow the outflow of the filtered liquid, a backwash apparatus and a supply system for supplying filtered liquid to the backwash apparatus. The supply system may comprise a backwash connecting tube arranged to pass through the inner space, and a plurality of spray tubes connected to the backwash connecting tube and extending inside said inner space.

According to a third aspect of the present invention there is provided apparatus comprising a filter or rotating disc filter which is meant to be partially immersed in a liquid to be filtered to obtain a filtered liquid. The filter may comprise a structure supporting filter sectors, the filter sectors arranged to separate an external region containing the liquid to be filtered from an inner space containing the filtered liquid, wherein the filtered liquid is maintained at a lower level than the level, L, of the liquid to be filtered (resulting in a pressure difference across the filter), wherein the support structure, is rotatably mounted around an axis on external supports and has at least one passage to allow the outflow of the filtered liquid, a backwash apparatus and a supply system for supplying filtered liquid to the backwash apparatus. The supply system may comprise a backwash connecting tube arranged to pass through the inner space, and a plurality of spray tubes connected to the backwash connecting tube and extending inside said inner space.

The apparatus may comprise a structure formed by two circular end plates, mounted on an external supports so as to be rotatable about an axis, a plurality of discs, the end discs of which are fixed to the two circular end plates, each disc taking the shape of a circular ring with an inside radius and an outside radius and carrying, between the inside radius and the outside radius, a multiplicity of filter sectors, facing one another and delimiting an internal disc compartment which is closed peripherally on the outside radius by a cylindrical sleeve and is open on the inside radius towards a common inner space formed by cylindrical portions that separate one disc from another. The apparatus further comprising a supply system for supplying filtered liquid including a reservoir, a pump and instruments for operation of the supply system. The supply system may be configured to supply a backwash apparatus comprising a backwash connecting tube which passes through said common inner space, and a plurality of spray tubes connected to the backwash connecting tube and extending inside said internal region containing the filtered liquid, above the level of filtered liquid.

The apparatus may further comprise a motor and a gearbox arranged to rotate the structure. The apparatus may comprise an oscillation device for causing the rotation of the backwash connecting tube. The oscillation device may be located outside said common inner space on each of said circular end plates and passes within said common inner space and mounted on supports coaxial with the axis. At least one of said circular end plates has an aperture communicating with said common inner space for allowing outflow of the filtered liquid. The oscillation device may comprise a ring gear fixedly mounted on said aperture and an eccentric pinion rotatably mounted on said backwash apparatus near said backwash connecting tube, the eccentric pinion engaging with said ring gear. Alternatively, the oscillation device may comprise a lobed cam fixedly mounted on said aperture and a roller cam follower rotatably mounted on said backwash apparatus near said backwash connecting tube. Each spray tube may have a plurality of opposed nozzles directed towards the filter sectors. The supply system for supplying filtered liquid to the backwash apparatus may be configured to supply a washing apparatus. The washing apparatus may comprise a washing connecting tube mounted outside said structure parallel to the axis and a plurality of spray tubes joined to the washing connecting tube, wherein each spray tube extends between two adjacent discs so as to act externally on the filter sectors and to direct filtered liquid jets tangentially downwards. The supply system for supplying filtered liquid may further comprise at least one pressure gauge, at least one a pressure switch and/or at least one a cartridge filter. The apparatus may be configured such that filtered liquid flows out of at least one aperture provided on said circular end plates through the filter sectors. The apparatus may further comprise a container for the liquid to be filtered. The apparatus may comprise a shelf disposed in the container, wherein the filter rests on the shelf such that the filter projects above the level of the liquid to be filtered the container. Alternatively, the apparatus may comprise a set of legs supporting the filter such that the filter projects above the level of the liquid to be filtered the container. The liquid may have a level inside the filter and at an aperture for allowing outflow of the filtered liquid from the filter. The filtered liquid level may be below the level of the liquid to be filtered in the container. The filter sectors may comprise a filtering material having pores in the range from 2 to 40 μm. The filter sectors may comprise a fabric or filtering material chosen from the group including polyester, polyethylene, PTFE, stainless steel, and nylon. The liquid to be filtered may contain suspended solids with a concentration from 1 g/L to 50 g/L. The apparatus may comprise air feeders for injecting air bubbles having sizes between macro bubbles and nano bubbles so as to create a turbulent motion externally to and in close proximity of the filter sectors. The height between the level of the liquid to be filtered and the level of the filtered liquid may be between 0 and 3 m (resulting in a pressure difference across the filter), and the thickness of the layer deposited on the filter sectors may be between 0 and 0.06 m. The flux of the filtered liquid (4) is between 0 L/(m$^2$h) and 5,000 L/(m$^2$h). The suspended solid content in the filtered liquid may be between 0 and 10 mg/L. The rotation speed of the discs may be between 0 and 1.047 rad/s (10 rpm). The number of discs may be between 1 and 40. The diameter of the discs may be between 0.5 m and 4 m.

The apparatus may comprise a filter which is meant to be partially immersed in a liquid to be filtered to obtain a filtered liquid. The filter may comprise a structure supporting filter sectors. When the filter is partially immersed, the filter sectors separate an external region containing the liquid to be filtered from an internal region containing the filtered liquid, and the filtered is maintained at a lower level than the level of the liquid to be filtered, wherein the support structure is rotatably mounted around an axis on external supports and has at least one passage to allow the outflow of the filtered liquid herein the internal region is divided into at least two separate, unconnected parts for holding liquid.

According to a fourth aspect of the present invention there is provided apparatus comprising a filter which is meant to be partially immersed in a liquid to be filtered to obtain a filtered liquid. The filter may comprise a structure supporting filter sectors. When the filter is partially immersed, the filter sectors separate an external region containing the liquid to be filtered from an internal region containing the filtered liquid, and the filtered is maintained at a lower level than the level of the liquid to be filtered, wherein the support structure is rotatably mounted around an axis on external supports and has at least one passage to allow the outflow of the filtered liquid herein the internal region is divided into at least two separate, unconnected parts for holding liquid.

The filter may be disposed in a frame and positioned inside a vessel and has a filter structure comprising first and second circular end plates mounted on external supports so as to be rotatable about an axis, a plurality of discs including first and second end discs to which the first and second circular end plates are mounted respectively, each disc in the form of a circular ring with an inside radius and an outside radius and carrying, between the inside radius and the outside radius, a plurality of filter sectors, facing one another and delimiting an internal disc compartment which is closed peripherally on the outside radius by a cylindrical sleeve and is open on the inside radius towards a common inner space formed by cylindrical portions that separate one disc from another and at least an outflow aperture, communicating with said common inner space to allow the outflow of the filtered liquid, the outflow aperture connected by a first flange to a flanged aperture in one of the first or second circular end plates, wherein the internal common space is divided by a separating wall. Each part may be provided with a respective turbidity sensor. The apparatus may further comprise at least one motorised stop valve, each of the at least one motorised stop valves provided downstream of a respective outflow aperture for stopping outflow of the filtered liquid. Each circular end plate may be being in the shape a circular ring with an inside radius equal to the inner radius of the discs and carries, between the inner radius and the outside radius equal to the outside radius of the discs, a plurality of filter sectors facing an identical plurality of filter sectors belonging to said end discs. Each external support may be configured to support an outflow aperture connected by a first flange to a flanged aperture of its own circular end plate has a sliding friction or bushing in a bushing-bearing sleeve that is joined by a second flange to the frame of the filter, the bushing being internally next to the outflow aperture and having on each end a proximal and a distal labyrinth seals coaxial to the outflow aperture and to the bushing-bearing sleeve, the bushing and the second labyrinth seal having travel limits on hard stops on the outflow aperture. The apparatus may comprise proximal and distal labyrinth seals and may comprise an internal ring with external grooves and an external ring with internal grooves coaxial and coupled to the external grooves to delimit an internal space between the rings, both being solidly connected to the outflow aperture and to the bushing-bearing sleeve. The internal ring and external ring are made of polytetrafluoroethylene. The apparatus may comprise greasing nozzles on top of the external sleeve connected by channels to the space internal to the distal and proximal labyrinth seals, wherein an inner part of the bushing is delimited by the outflow aperture. The structure may be mounted rotatably around an axis on external supports and rotated by a first group comprising a gearbox and a transmission shaft. The apparatus may further comprise a second group comprising a second gearbox and transmission shaft arranged to work in conjunction with the first group, wherein the first and second groups are at the opposite end of the machine. The apparatus may comprise first and second filtered water supply systems, each filtered water supply system comprising a reservoir for filtered water, a pump and a control for controlling supply of the filtered water to a backwash apparatus and a wash apparatus. The backwash apparatus may include a backwash connecting tube which passes through said common inner space and a plurality of spray tubes connected to the backwash connecting tube, wherein each spray tube extends a respective internal region of each disc, each spray tube having a plurality of opposed nozzles directed towards the filter sectors. The apparatus may further comprise at least one pressure-compensating tube having a first end in communication with an internal region above the level of the filtered liquid and a second end selectively in communication with the external environment and a pump for selectively providing a pressure locally in said internal region which is larger than the atmospheric pressure.

According to a fifth aspect of the present invention there is provided a method of filtering a liquid having total suspended solids of between 1 and 50 g/L using a liquid-permeable filtering element having first and second faces so as to produce filtered liquid having total suspended solids of no more than 10 mg/L, the method comprising:
  cycling the liquid-permeable filtering element through the liquid whereby, in a first position, an area of the first face of the filtering element is subjected to liquid under pressure and a pressure across the filtering element is between 0 kPa and 5.9, and, in a second position, the area is not subjected to liquid under pressure or is subjected to liquid at a lower pressure, and solids accumulated on the first face of the filtering element can be removed by directing at least one jet from the second side of the filtering element through the filtering element towards the first side of the layer;

wherein the filtering element has a pore size and the filtering element is cycled at a speed such that permeation flux is between 200 L/(m²h) to 5,000 L/(m²h) and a thickness of a layer of accumulated solids when removed is between 0 and 6 cm.

The liquid-permeable filtering element may be arranged to be cycled through the liquid such that, in the first position, the area of the first face of the filtering element is subject to liquid under pressure and a pressure across the filtering element is between 0 and 3.9 kPa. The pore size may be between 2 and 40 µm and may be between 15 to 25 µm. The speed may be 0.25 to 30 m/min. The method may comprises providing a having total suspended solids of between 15 and 40 g/L, for example between 20 and 40 g/L. The thickness of accumulated solids when the filtering element reaches the second position may be between 0 and 2 cm. The filtering element may be configured to be cycled at between 0 and 1.047 rad/s (10 rpm), between 0 and 0.21 rad/s (2 rpm) or between 0 and 0.105 rad/s (1 rpm). The permeation flux may be configured to be between 1,000 L/(m²h) to 5,000 L/(m²h), for example, between 2,000 L/(m²h) to 5,000 L/(m²h). The liquid-permeable filtering element may include pores having a range of different pore sizes, the pore sizes being between 2 and 40 µm. The method may include introducing gas bubbles into the liquid.

The liquid-permeable filtering element may comprise a mesh. The liquid-permeable filtering element may comprise a polymer, for example, polyester, polyethylene, PTFE, or nylon. The liquid-permeable filtering element may comprise a metal, stainless steel. The liquid-permeable filtering element may be partially submerged in the liquid. Between 50 to 75% of the liquid-permeable filtering element is submerged in the liquid. The accumulated solids may be removed periodically. The accumulated solids may be removed every cycle. The period may be between 10 to 1000 s. The method may comprise causing a height difference between the liquid and the filtered liquid across the filtering element so as to control the pressure across the filtering element. In the second position, the area may be above the liquid. The method may comprise directing a jet at the first face of the filtering element in dependence on the pressure across the filtering element exceeding a predetermined level. The method may further comprise introducing or increasing rate of gas bubbles into the liquid in dependence on the pressure difference across the filtering element exceeding a predetermined level.

The liquid may be wastewater.

According to a sixth aspect of the present invention there is provided a computer program which, when executed by a computer, causes the computer to perform the method.

According to a seventh aspect of the present invention there is provided a computer program product comprising a computer-readable medium (which may be non-transitory) storing the computer.

According to an eighth aspect of the present invention there is provided a system comprising the apparatus, a set of one or more sensors arranged to monitor the apparatus, a set of one of more actuators and/or a set of one or motors arranged to control the apparatus and a computer system arranged to receive signal(s) from the set of one or more sensors and to provide control signals to control the set of one of more actuators and/or set of one or motors.

The computer system may be arranged to control a rate of deposition of solids on the filtering element, a degree of compaction of the solids and/or a rate of re-introduction of solids back into the liquid.

BRIEF DESCRIPTION OF THE DRAWINGS

Certain embodiments of the present invention will now be described, by way of example, with reference to the accompanying drawings, in which.

DETAILED DESCRIPTION OF CERTAIN EMBODIMENTS

Figure 1:
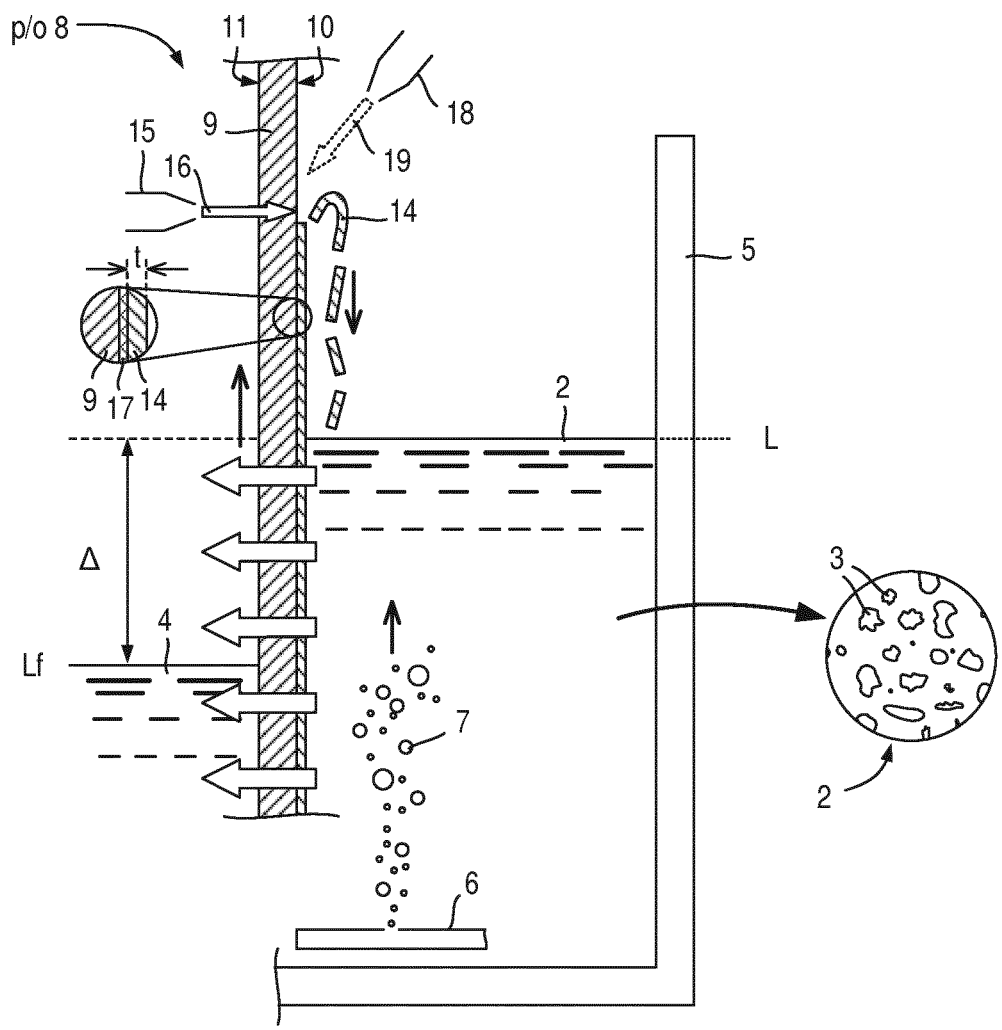
FIG. 1 is a schematic diagram of apparatus for filtering a liquid.

In the following, like elements are denoted with like reference numerals.

Introduction

Referring to FIG. 1, apparatus 1 is shown for filtering a suspension 2 (herein referred to as a "liquid" or "feed"), such as wastewater, by removing solid content 3 from the liquid 2 to produce filtered liquid 4.

The apparatus 1 includes a container 5, such as a tank, which is filled with liquid 2 to a level, L. The level L can be maintained by feeding liquid 2 into the container 5 on an influent side as filtered liquid 4 (herein also referred to as "filtrate") is taken away from an effluent side. As will be explained in more detail later, the level, L, of the liquid 2 and the level, Lf, of the filtered liquid 4, can be varied to control the pressure difference driving the filtering process.

The apparatus 1 includes gas feeder(s) 6 (or "aerators") for introducing bubbles 7 of gas, preferably air, into the liquid 2 and a filtering machine 8 (only part of (p/o) which is shown in FIG. 1) at least partially submerged in the liquid 2 over the gas feeder 6. Herein, the filtering machine 8 may be referred to simply as a "filter".

The filtering machine 8 includes one or more liquid-permeable filtering elements 9 (herein also referred to as "filtering elements", "filter sectors", "substrates" or "meshes"), each filtering element 9 having first and second opposite faces 10, 11 (herein also referred to as "outer and inner faces" or "external and internal faces"), which can be cycled (or "cyclically moved") into and out of the liquid 2.

While a filtering element 9 is submerged in the liquid 2, liquid 2 can pass through it under a pressure difference resulting from being submerged. As the liquid 2 passes through the filtering element 9, solid content 3 is removed from the liquid 2 and deposited (or "accumulated") as a layer 14 on the first face 10 of the filtering element 9. Herein, the layer 14 is also referred to as a "deposited layer", "accumulated layer", "sludge layer", "cake" and "dynamic membrane".

One or more internal nozzles 15 (herein also referred to as a "spray bar") can be used to direct spray(s) or jet(s) 16 of a liquid (such as the filtered fluid 4) at the inner face 11 of the filtering element(s) 9 to control the thickness of the layer 14 deposited on the filtering elements 9. The spray(s) 16 can be used to maintain a thin, boundary layer 17 of fluid between the outer face 10 of the filtering element 9 and the layer 14.

One or more external nozzles 18 can be used to direct external spray(s) or jet(s) 19 of a liquid (such as the filtered fluid 4) at the outer face 10 of the filtering elements 9 to help dislodge the layer 14.

The apparatus 1 is arranged to control the rate of deposition of solids, the degree of compaction of the solids and the rate of re-introduction of solids back into the liquid 2. Whereas in a membrane bioreactor, the deposition of solids on a membrane is discouraged or avoided, in the apparatus 1 described herein, the deposited layer 14, which is liquid-permeable, is used to help provide additional, finer filtering.

For a liquid-permeable filtering element 9 having a mesh free passage of 5 to 40 μm, measurements have shown that the deposited layer 14 has an equivalent nominal pore size of between 0.04 and 0.4 μm.

Figure 2:
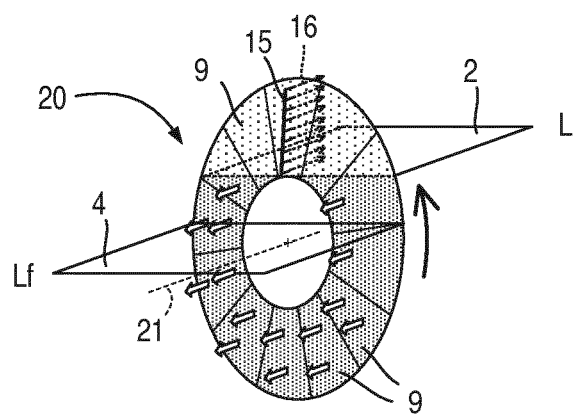
FIG. 2 is a schematic perspective view of a filtering element arrangement.

Referring to also to FIG. 2, the filtering elements 9 take the form of thin, annular sectoral, filtering elements 9 (hereinafter also referred to as "filter sectors") which are assembled to form an annular filter 20.

As will be described in more detail hereafter, each filter sector 9 can be held in a respective 'U'-shaped element ("holder" or "rack") which allows the filter sectors to be replaced.

As will also be described in more detail hereafter, a pair of axially-offset annular filters 20 form part of a disc 31 (FIG. 4) having an annular space 34 (FIG. 4) into which liquid flows from opposite sides through submerged filtering elements 9. The filtering machine 8 comprises an array (or "battery") of such discs 31 (FIG. 26) arranged in a row.

The annular filter 20 is partially submerged, orientated perpendicular or inclined to the level L of the liquid 2, and rotates about an axis 21 of rotation. Thus, filtering elements 9 pass into the liquid 2, move through the liquid 2 and then leave the liquid 2 travelling along a circular path. While a filtering element 9 is in the liquid 2, liquid 2 is forced under the pressure difference through the filtering element 9.

Although embodiments of filtering machines are described herein which take the form of rotary disc filtering machines having filtering elements 9 which have an annular sector shape, the filtering machine and the filtering element(s) 9 can take other forms which allows them to be cycled into and out of the liquid 2.

Figure 3:
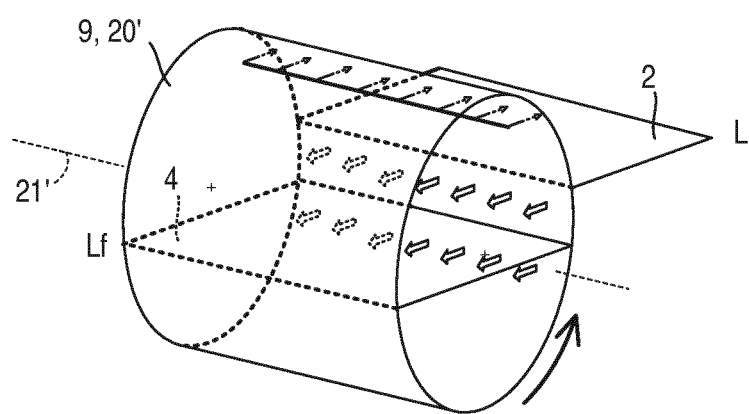
FIG. 3 is a schematic perspective view of an alternative filtering element arrangement.

Referring to FIG. 3, a filtering element 9 may take the form of a cylindrical filtering element 9 which forms a cylindrical filter 20'. Alternatively, filtering elements 9 may take the form of curved parts which can be assembled to form the cylindrical filter 20'. The cylindrical filter 20' has a central axis which also serves as its axis 21' of rotation. The cylindrical filter 20' is partially submerged, having its central axis 21' orientated parallel to the level L of the liquid 2.

Other filtering element shapes and arrangements can be used, such as a belt or band of liquid-permeable filtering material.

Figure 4:
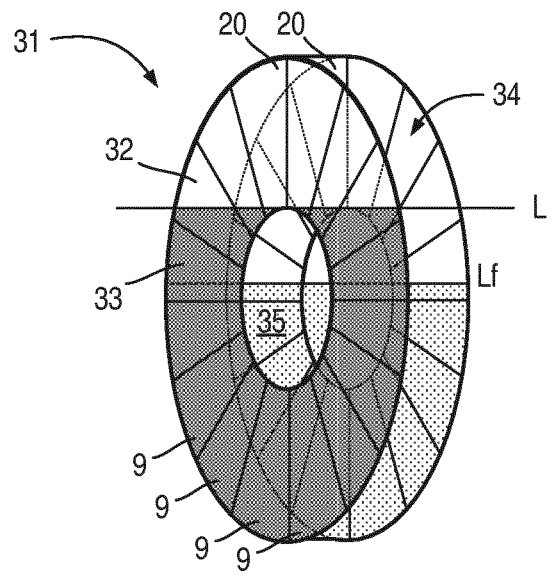
FIG. 4 schematically illustrates a disc.

Referring to FIG. 4, the filtering machine 8 includes a plurality (although only one is shown for clarity) of horizontally-separated, vertically-orientated discs 31 (or at an angle), each disc 31 comprising first and second annular filters 20, each annular filter 20 comprising filtering elements 9, preferably made from a plastic.

The discs 31 are partially submerged in the fluid 2 having a submergence (i.e., proportion of the area of the disc which is submerged) of between 40 and 75%. Thus, a first portion 32 of each disc 31 (shown unshaded) is above the level of the fluid 2 (i.e., not submerged) and a second portion 33 of the disc 31 (shown shaded) is submerged.

An annular space 34 is defined between the first and second annular filters 20 in which the filtered liquid 4 gathers. The filtered liquid 4 is drawn off through an inner space 35.

The filtering machine 8 is arranged such that the discs 31 rotate between 0 and 10 revolutions per minute (0 and 10 ($2\pi/60$) rad/s).

Figure 5:
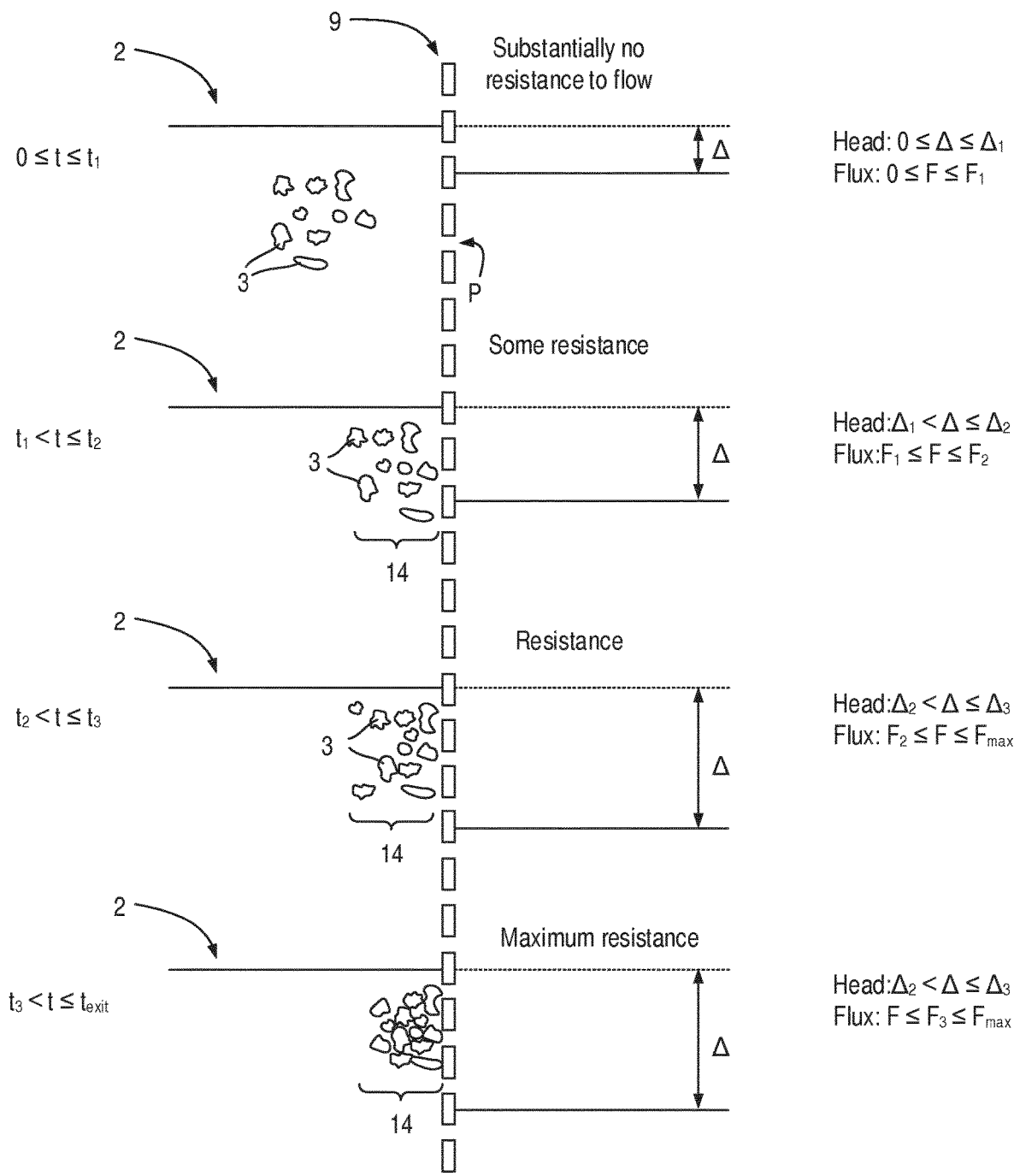
FIG. 5 schematically illustrates different stages during filtering.

Referring to FIG. 5, electrostatic attraction and repulsion between the liquid 2, filtering elements 9 and sludge 14 can affect the filtering process. For example, water is hydrophilic and carries a negative charge. The filtering elements 9, particularly if formed from a plastic such as polyethylene, tend to be highly hydrophobic and carry a positive charge. The sludge 14 tends to be hydrophobic, carrying a small positive charge.

During a first period between $t=0$ and $t=t_1$ ($0 \le t \le t_1$), when a substrate 9 first enters the liquid 2 and the head difference $\Delta$ is between 0 and $\Delta_1$ ($0 \le \Delta \le \Delta_1$), the substrate 9 provides substantially no resistance to the flow of liquid 2 through the substrate 9. Because the head difference (and corresponding pressure difference) is small, the flux F is low, between 0 and $F_1$ ($0 \le F \le F_1$). The value of $t_1$ is about 1 s and $\Delta_1$ is about 0.5 cm.

The substrate 9 generally is free of sludge 14. Solid particles 3 larger than the substrate apertures (i.e., pores), having a pore size P, tend to be repelled. However, as the substrate 9 becomes more submerged and the head difference $\Delta$ increases (increasing the pressure difference), the flow of fluid 2 through the substrate 9 forces solid particles 3 towards the substrate 9 thereby forming a thin cake 14.

During a second period between $t=t_1$ and $t=t_2$, the head difference $\Delta$ increases (increasing the pressure difference) and is between $\Delta_1$ and $\Delta_2$ ($\Delta_1 \le \Delta \le \Delta_2$). The substrate 9 starts to provide some resistance to the flow of liquid 2 through the substrate 9. Particles 3 begin to collect loosely on the substrate 9 and a cake 14 starts to form. The value of $t_2$ is about 2 s and $\Delta_2=1$ cm.

Figure 6:
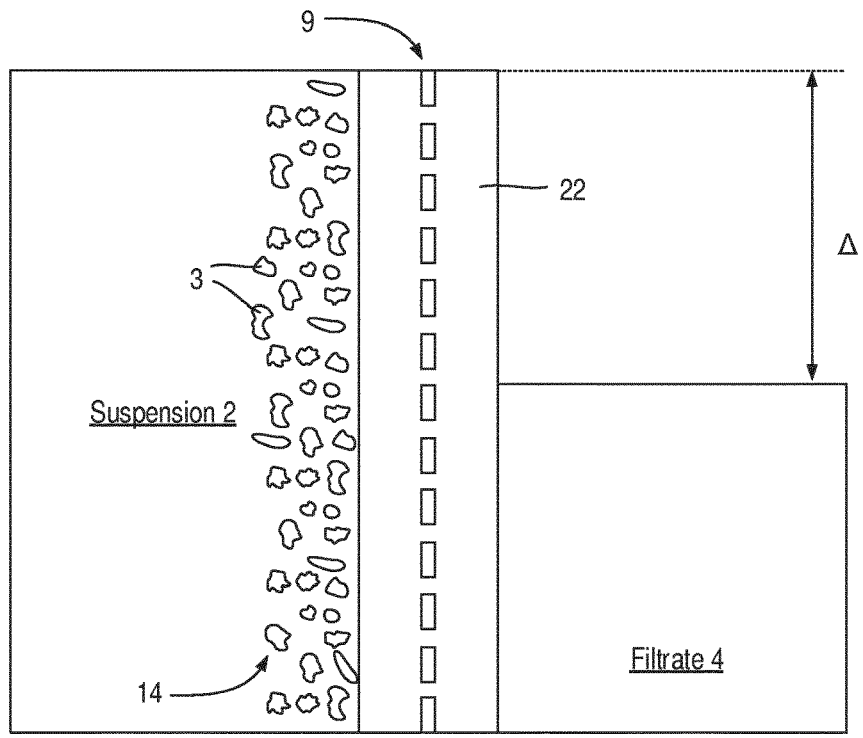
FIG. 6 schematically illustrates a suspension, a substrate and filtrate as the substrate is introduced into the suspension.

Referring also to FIG. 6, the thin cake 14 restricts flow of liquid 2, such as water and smaller particles, and so the cake layer 14 grows but water 2 still flows through the cake layer 14 and the substrate. As the cake 14 develops, the positive charge of the substrate 9 and the sludge 14 and the negative charge of the water 2 help to form a thin water boundary layer 22 between the substrate and cake.

During a third period between $t=t_2$ and $t=t_3$, the head difference $\Delta$ increases further (further increasing the pressure difference). Thus, the flux F increases. The value of $t_3$ is about 5 s and $\Delta_3=5$ cm.

As the cake rotates, the pressure difference (arising from head difference $\Delta$) drops across the cake 14 and substrate decreases, the water velocity decreases, making the filtration process easier.

The highest flux occurs when the cake 14 and the substrate 9 enters into filtrate 4. However, as the cake 14 becomes thicker, then the flux F will begin to decrease.

Figure 7:
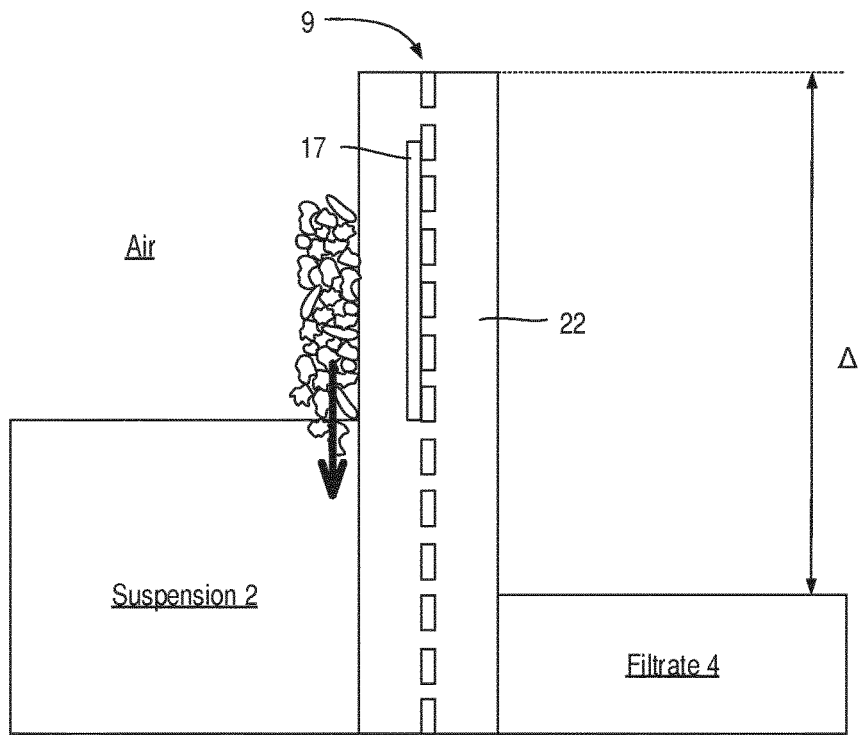
FIG. 7 schematically illustrates a suspension, a substrate and filtrate as the substrate is removed from the suspension.

Referring also to FIG. 7, as the cake 14 is pulled out of solid suspension 2, gravity acts on water boundary layer 22 helped by back wetting of substrate.

Once force on the cake 14 from gravity becomes greater than boundary friction, the cake 14 slides into the solid suspension leaving a clean substrate 9.

The process is repeated when the substrate is re-introduced into the suspension 2.

As mentioned earlier, the filtering processes herein described can benefit from using a plastic mesh, such as polyethylene having a mesh size of, for example, 20 μm.

These processes can additionally benefit from capillary action, which is a sucking effect, in conjunction with surface tension. Capillary force can be very strong and depends on the material used to form passages or channels (in other words, the pores in the substrate), the dimensions of the passages or channels ("capillary"), as well as the location of a source and destination for water. Furthermore, a water film on the inside face of the substrate (i.e., on the filtrate side) is exposed to air and so surface tension also pulls on the water in the capillary and accelerates water through the capillary. At the same time, this force creates an equal, but opposite, force that repels solids and creates a larger positive charge on the mesh. Thus, ensuring that the filter material 9 is fully wetted when it is exposed to air can help promote filtering, and can result in surprisingly high flux rates and high-quality filtrate.

Referring to FIGS. 1 and 4, this process is performed by cycling the substrate 9 through the liquid 2. As a portion of disc 31 enters the liquid 2, solid content 3 adheres to and is becomes bound to the disc 31. As the disc 31 continues to rotate, there is further build-up of solid content 3. By the end of a quarter rotation, the accumulated layer 14 can have a thickness, t, of between 0.5 and 10 mm. The thickness, t, depends on the solid content 3 and the flux, F.

The driving force used to urge liquid 2 through the substrate 9 and cause deposition of solid content 3 is generated by a differential level, $\Delta$, (and a corresponding pressure difference) between the outside and inside of the filter, i.e., between the first and second faces 10, 11. The driving force is typically between 3 and 5 cm (i.e., 3 cm $\le \Delta \le 5$ cm), but can be as high as 0.4 m ($\Delta \le 0.4$ m).

The filtering process is characterised by a flow of fluid through a specific surface of the substrate and which can be defined in terms of a flux, F (measured in L/(m²h) or "LMH"). The filtration cycle allows for fluxes of equal to or more than 250 L/(m²h) and equal to or less than 5,000 L/(m²h) at maximum level differential, i.e. for $\Delta=40$ cm.

Rotation (i.e., cycling) of the disc 31 is used not only to deploy the substrate 9 in the liquid 2 and so allow the dynamic membrane 14 to form, but also to remove the substrate 9 from the liquid 2 and control formation of the dynamic membrane 14.

If left unchecked, deposition of solid content 3 can continue until the substrate 9 is clogged and partially dewatered.

To avoid dewatering, a spray 16 of filtrate (i.e., filtered fluid 4) or fluid from another source can be applied to the inside surface 11 of the substrate 9 above or below the fluid level, L. The internal spray 16, in combination with biological aeration or additional machine aeration can help prevent excessive solids build-up. The combination of rotation, aeration, an external spray 19 of filtrate (or other clean liquid), head differential, substrate pore size (or "aperture size"), and internal spray helps maintain the desired thickness, t, of the dynamic membrane 14 for a given application.

Table A below sets out different programmes (setting rotation speed and time, the use of back wash and aeration) for filtering.

TABLE A

| Water differential Δ | Rotation speed/time 0 to 10 rpm (100% = 10 rpm) | Wash water | Aeration |
|---|---|---|---|
| 0-10 cm | 50% speed 100% time | 100% flow back wash 100% time back wash | Fine bubble biological aeration 50% capacity 100% time |
| 10-15 cm | As above | 100% flow back wash 100% time back wash | Coarse bubble 100% speed Intermittent |
| 15-20 cm | 100% speed 100% time | 100% flow back wash 100% time back wash | Coarse bubble 100% speed Intermittent |
| 20+ cm | As above | As above + External wash system 1 in every 2 rotations | Coarse bubble 100% speed Intermittent |

A thicker dynamic membrane 14 can be used to increase the degree of filtration (i.e., to enhance separation). The maximum level differential (pressure difference) and a dynamic membrane thickness can be selected to achieve a required degree of separation and quality of filtrate.

As the disc 31 rotates further, the dynamic membrane 14 is pulled out of the fluid 2 and exposed to air. The fluid film 17 between the substrate 9 and the dynamic membrane 14 allows the membrane 14 to peel away from the substrate 9 by gravity and fall back into the fluid 2. The spray can help to form a membrane-free substrate area. A film of water may be present on membrane-free substrate. A combination of gravity, and internal and external sprays may present a membrane-free substrate area that may have a water film.

Figure 8:
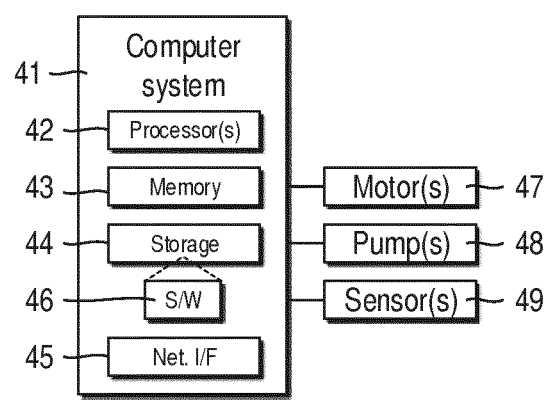
FIG. 8 is a schematic block diagram of a computer system for controlling the filtering apparatus.

Referring also to FIG. 8, the filtering apparatus 1 includes a computer system 41 which includes at least one processor 42, memory 43, non-volatile storage 44 and a network interface 45. The computer system 41 runs control software 46 which is loaded into memory 43 from storage 44 and executed by the processor(s) 42. The computer system 41 controls one or more motors 47 which drive rotation of the array of filters, and pump(s) and/or valves 48 for the spray bars 15, 18. The computer system 41 may receive signals from sensors 49, e.g., level sensors.

The control software 46 can be used to switch the machine between different operating states according to the level differential. For example, for a relatively large level differential (pressure difference), the software 46 can cause the discs 31 to rotate more quickly, and to use more intense spraying and aeration. For a relatively small level differential (pressure difference), the software 46 may cause the discs 31 to rotate more slowly (or even not at all) and to use intense spraying (or even none at all) and/or less aeration (or even none at all).

For excessive deposition of solids, dewatering of the dynamic membrane 14 can occur and result in cake filtration. Cake filtration can cause localised dewatering of the cake such that a fixed, dense layer, which does not move, is formed. The external spray bar 18 can be used to remove the cake. The spray 19 is angled such that it slices the cake away from the substrate 9 rather than smashing the cake and forcing the cake through the substrate 9. This form of recovery cleaning can be used, for example, if the level differential (pressure difference) cannot be sufficiently reduced otherwise.

The deposited layer 14, once removed, falls back into the fluid 2 where it mixes into the fluid (referred to as "resuspended) and is redistributed within the fluid 2.

The filtering machine 8 can process fluid 2 having suspended solid content from 2 g/L to 20 g/L or 40 g/L, which may even rise to a localised suspended solid content of 50 g/L in the vicinity of the filters. The dynamic membrane 14 has been measured at above 3-5% dry substance (DS) and falls into the fluid 2 (5% DS=50 g/L).

Structure for a Rotating Disc Filter

Figure 9:
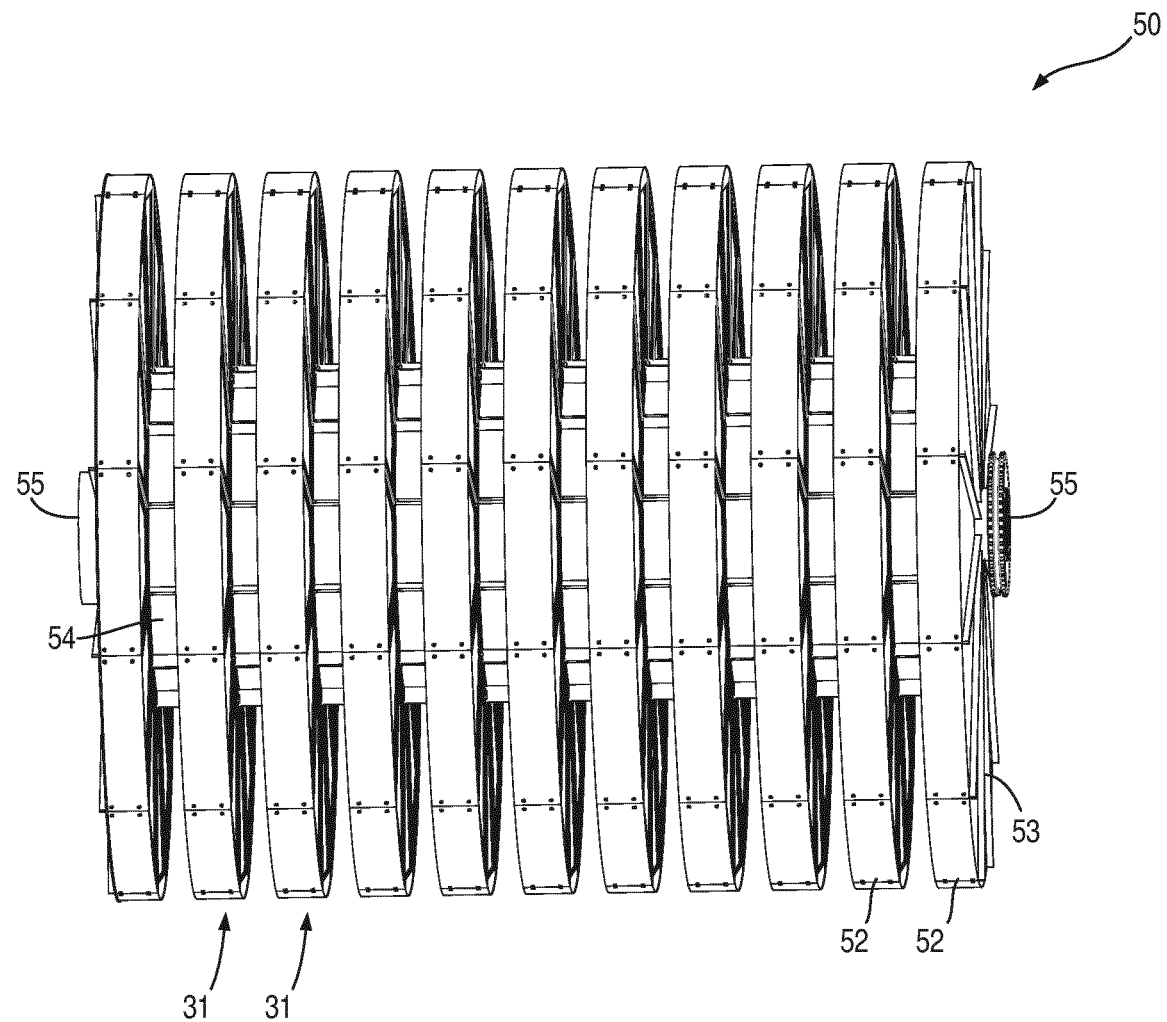
FIG. 9 is a perspective view of a structure for a rotating disc filter.

Referring to FIG. 9, a structure 50 of a rotating disc filter is shown in a perspective view. Discs 31 are coaxially spaced apart from one another. Each disc 31 carries a multiplicity of facing pairs of filter sectors (not shown) and communicates with a central inner space. Each disc 31 is closed by an outer cylindrical sleeve 52. The rotating filter comprises two circular end plates 53, each of which is provided centrally with an opening 55 for a rotatable support. A cylindrical portion 54 spaces apart two adjacent discs 31 and delimits, for its part, the central inner space of the disc filter.

The end plates 53 may hold filters to increase filter area. This can be use when only a few discs 31 are used. For example, by providing filters in the end plates in a four-disc unit increases the number of faces from six to eight.

Figure 10:
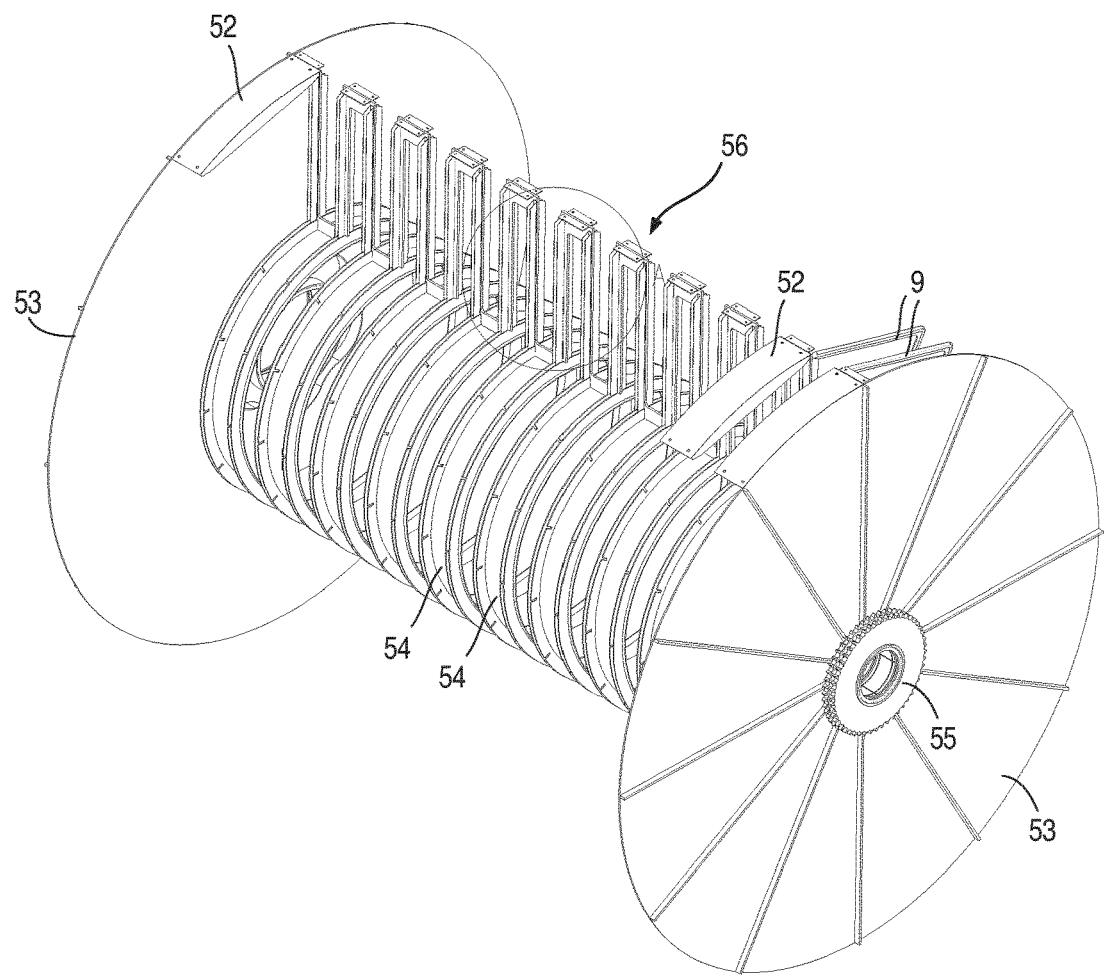
FIG. 10 is a perspective view of a longitudinal member of the structure combined with inner cylindrical portions of the same structure.

Referring now to FIG. 10, a perspective view of a longitudinal member of the structure combined with inner cylindrical portions of the same structure are shown.

Figure 11:
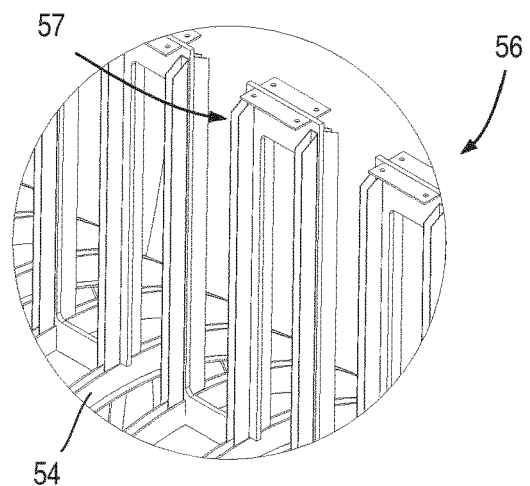
FIG. 11 is an enlarged detail shown in FIG. 10.

Longitudinal members 56 (herein referred to as a "upstanding member") extends radially from the cylindrical portions 54. The set of longitudinal members 56 shown in FIG. 10 is one of twelve sets of longitudinal members 56 provided in the structure. As shown best in FIG. 14, the longitudinal members 56 are spaced at 30-degree intervals about a central axis. Each longitudinal member 56 is made of successive modular components in the form of a square wave, as shown in more detail in FIG. 11, which is an enlarged detail of FIG. 10.

Figure 12:
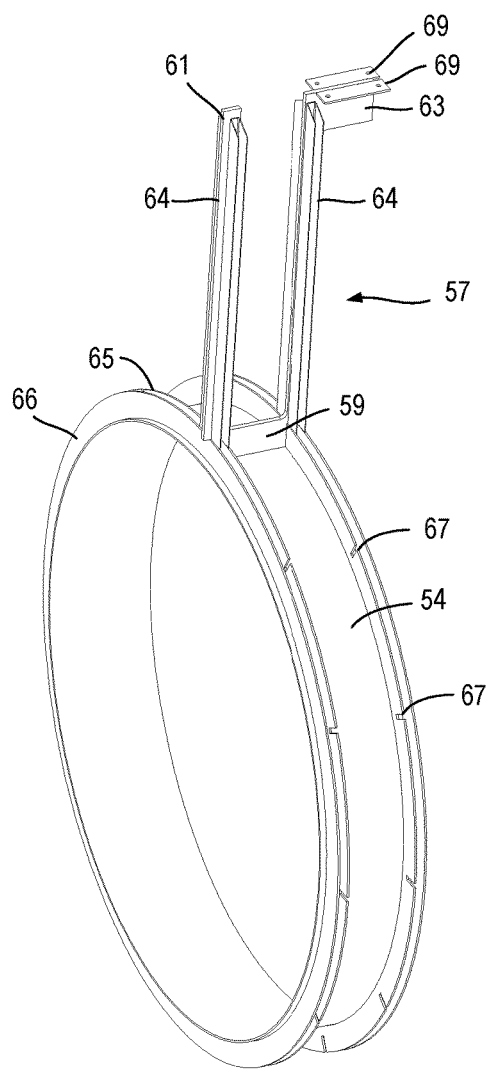
FIG. 12 is a perspective view of a modular component assembled with an inner cylindrical portion of the structure shown in FIG. 9.
Figure 13:
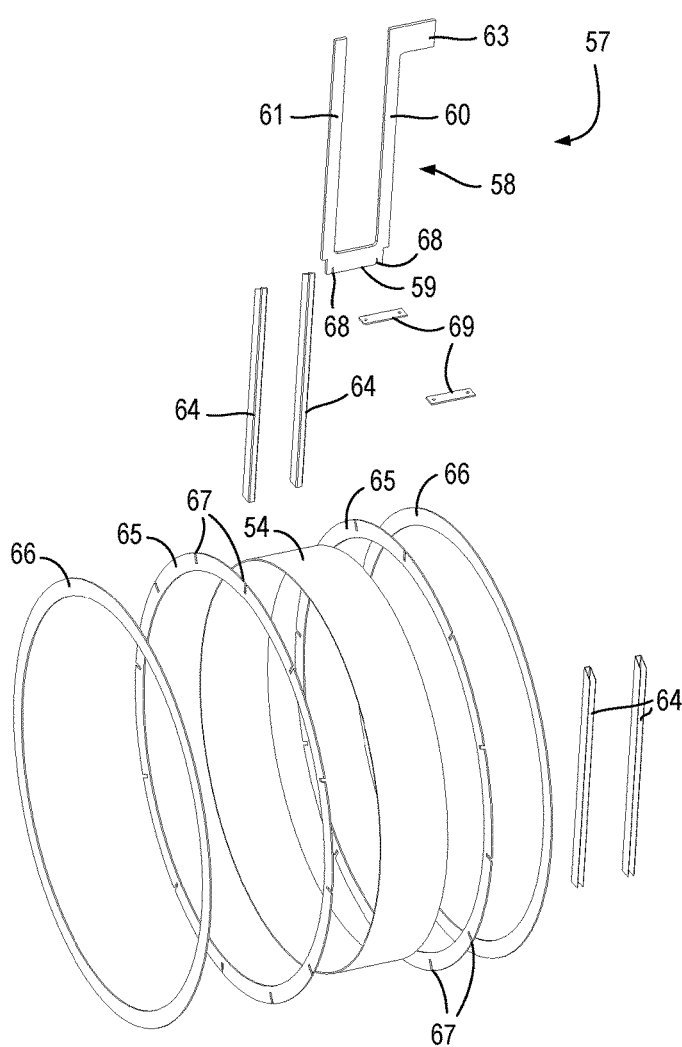
FIG. 13 is an exploded perspective view of a modular component of the structure according to the present invention, together with an inner cylindrical portion.

FIGS. 12 and 13 are a perspective view of an assembled and an exploded modular component, respectively, of the structure, combined with an inner cylindrical portion of the structure.

Referring to FIGS. 12 and 13, the modular component is in the form of a square wave is combined with an inner cylindrical portion. In particular, each square wave is made with a 'U'-shaped element 58. The 'U'-shaped element 58 has a wave trough 59 fixed to the cylindrical portion 54, and a rising wave edge and a falling wave edge 61 for supporting the consecutive filter sectors. Each 'U'-shaped element 58 also has a wave crest 63 that interacts with the other wave crests which are equidistant from one or other terminal circular plate 53, for supporting a portion of outer cylindrical sleeve 52 (FIG. 9).

Each 'U'-shaped element 58 preferably has a rising wave edge 60 and a falling wave edge 61 to which supporting guides 64 having the form of channels with a 'U'-shaped cross section are butt-welded to support facing filter sectors 9.

A pair of rings, namely a proximal ring 65 and a distal ring 66, spaced apart from one another, are mounted on each side of the cylindrical portion 54 to support the lower ends of the supporting guides 64. Each proximal ring 65, which is in contact with the inner cylindrical portion 54, is provided with angularly equidistant indentations 67, the number of which is equal to the number of longitudinal members of the embodiment of the structure. Correspondingly, the wave trough 59 has a pair of indentations 68 coaxial with the rising wave edge 60 and the falling wave edge 61. The indentations 68 are designed to engage with a pair of angularly equidistant indentations 67 on the ring in contact with the cylindrical portion 54.

The 'U'-shaped element 58 also has the wave crest 63 adapted for connection to a consecutive 'U'-shaped element 58. In a suitable way, the wave crest 63 supports facing plates 69 adapted for supporting the portion of outer cylindrical sleeve 52.

Figure 14:
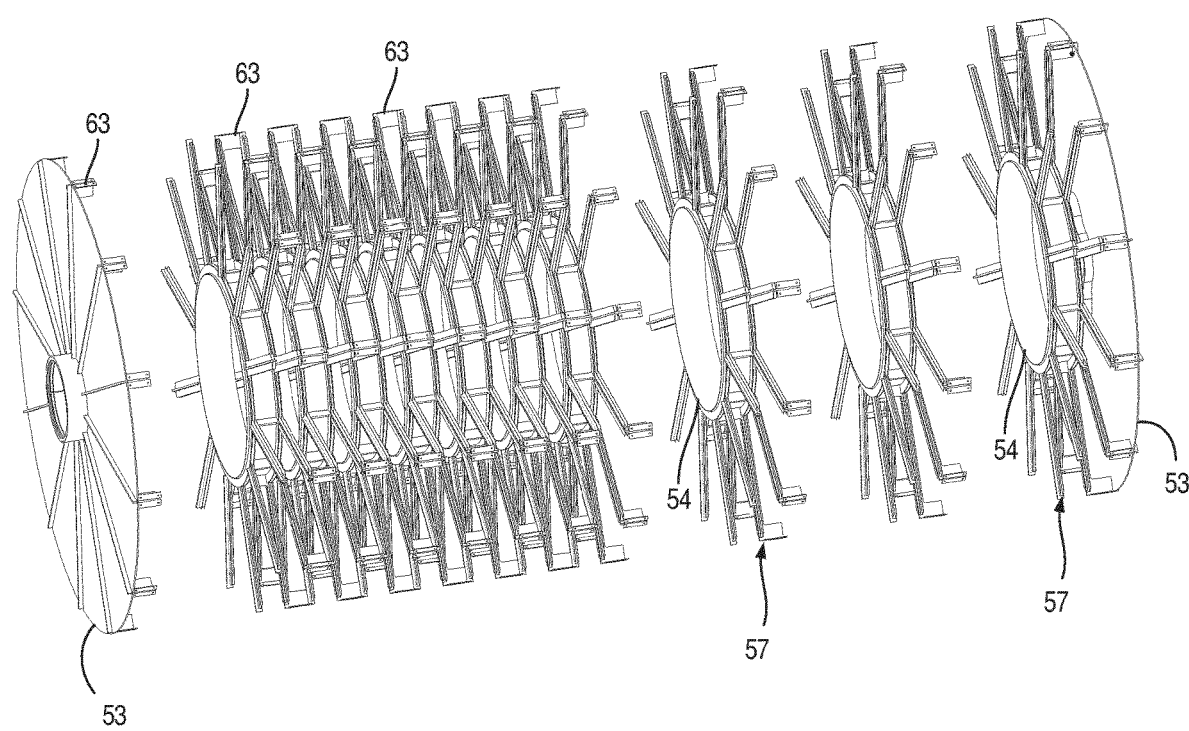
FIG. 14 is a partially exploded perspective view of the structure shown in FIG. 12.
Figure 15:
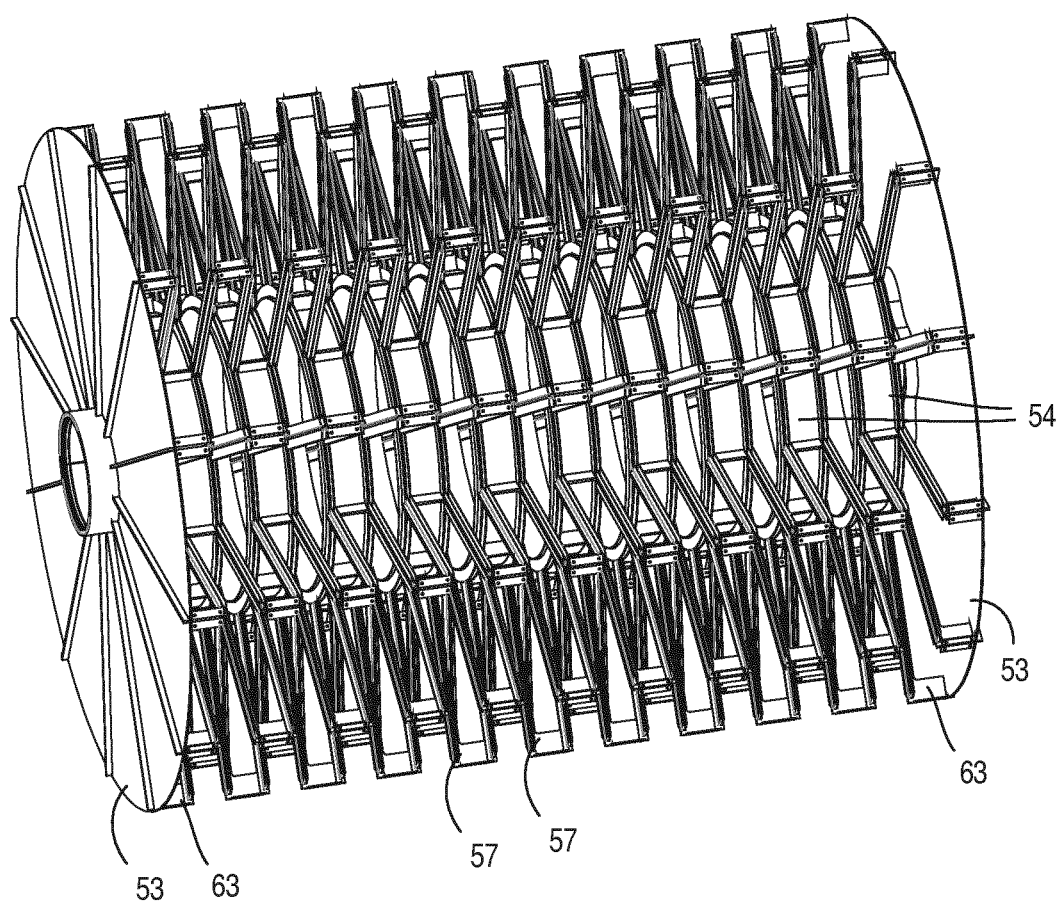
FIG. 15 is an assembled perspective view of the structure shown in FIG. 14.

FIGS. 14 and 15 are a partially exploded perspective view of the structure according to FIG. 12 and an assembled perspective view of the structure according to FIG. 14.

Referring first to FIG. 14, the modular components 57 are added for each inner cylindrical portion 54, of which there are twelve in the present embodiment. The modular components 57 are welded consecutively to form the assembled structure 50 of FIG. 16. It should be evident that the modular component of one end has a crest 63 for joining to the terminal circular plate which is added to the crest 63 of its 'U'-shaped element.

The structure 50, which is stable and robust, can allow rapid replacement of filter sectors.

Filtering Apparatus

Figure 16:
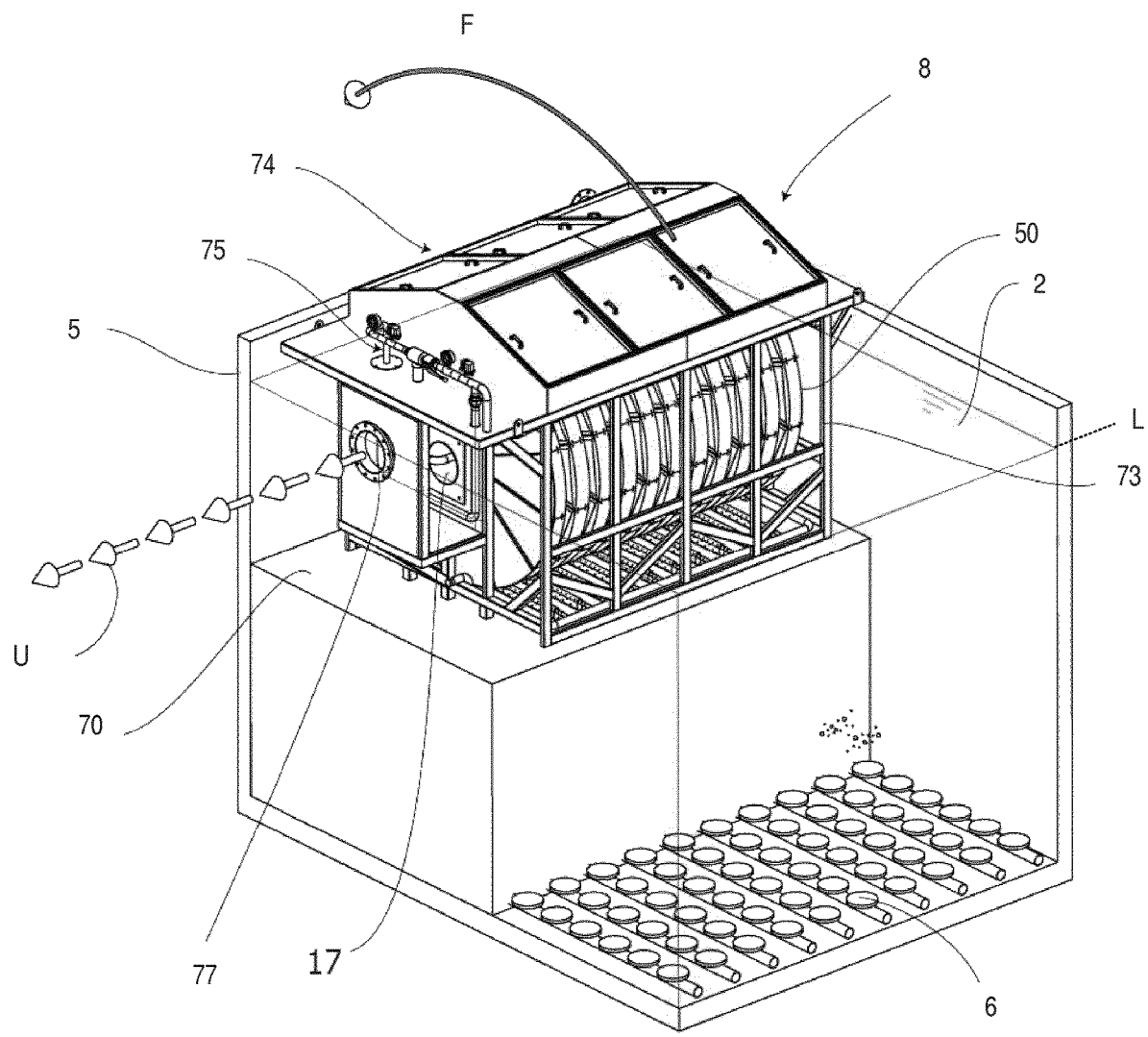
FIG. 16 is a perspective view of a rotating disc thickening vacuum filter in a purification vessel.

FIG. 16 is a perspective view of a first example of rotating disc filtering machine 8 for filtering a liquid 2. In the following description, the liquid 2 to be filtered is referred to as waste water for simplicity. The rotating disc filtering machine 8 can be used for thickening the liquid 2.

Referring to FIG. 16, the rotating disc filtering machine 8 (hereinafter referred to as a "rotating disc filter" or simply a "filter") is placed inside a container 5 (or "vessel") resting on a shelf 70. Air feeders 6 are positioned on the bottom of the vessel 5. The level L of the waste water 2 to be treated covers a large part of the filter 8.

The filter 8 comprises a structure 50, the nature of which will become clearer from the rest of the description, positioned rotatably inside a frame 73. More precisely, it is this frame 73 that rests on the shelf 70. A shelf need not be used. For example, the frame 73 may be provided with legs (not shown) which rest on the floor of the vessel 5 or the frame may be fixed to wall(s) of the vessel 5. A cover 74 with hatches constructed of metal is supported by the frame 73. The filtering machine 8 is provided with a filtered water supply system 75.

A first arrow F indicates the direction of rotation of the structure 50 inside the filtering machine 8. A set of second arrows U schematically indicate the outflow of the filtered water 4 from one side (or "end") of the filtering machine 8.

Figure 17:
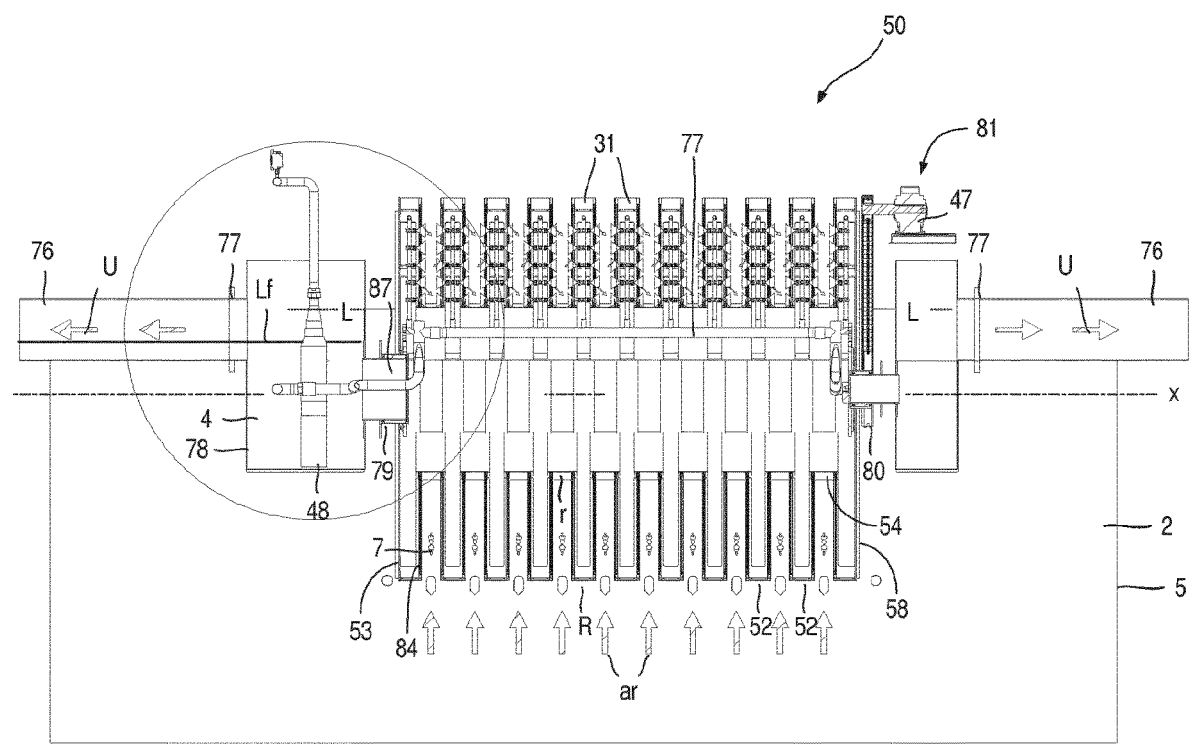
FIG. 17 is a schematic side view, in partial section, of the structure of the rotating disc filter and of its backwash apparatus.

FIG. 17 is a schematic side view, in partial section at the top, of the structure 50 of the filtering machine 8 and of its backwash apparatus.

Referring to FIG. 17, there is similar outflow of the filtered water 4 on the opposite side of the of the filtering machine 8. The outflow U from both sides of the filtering machine 8 is conveyed in a tube 76 connected to a flange 77. Alternatively, the filtering machine 8 can be implemented with a single outlet U.

Figure 18:
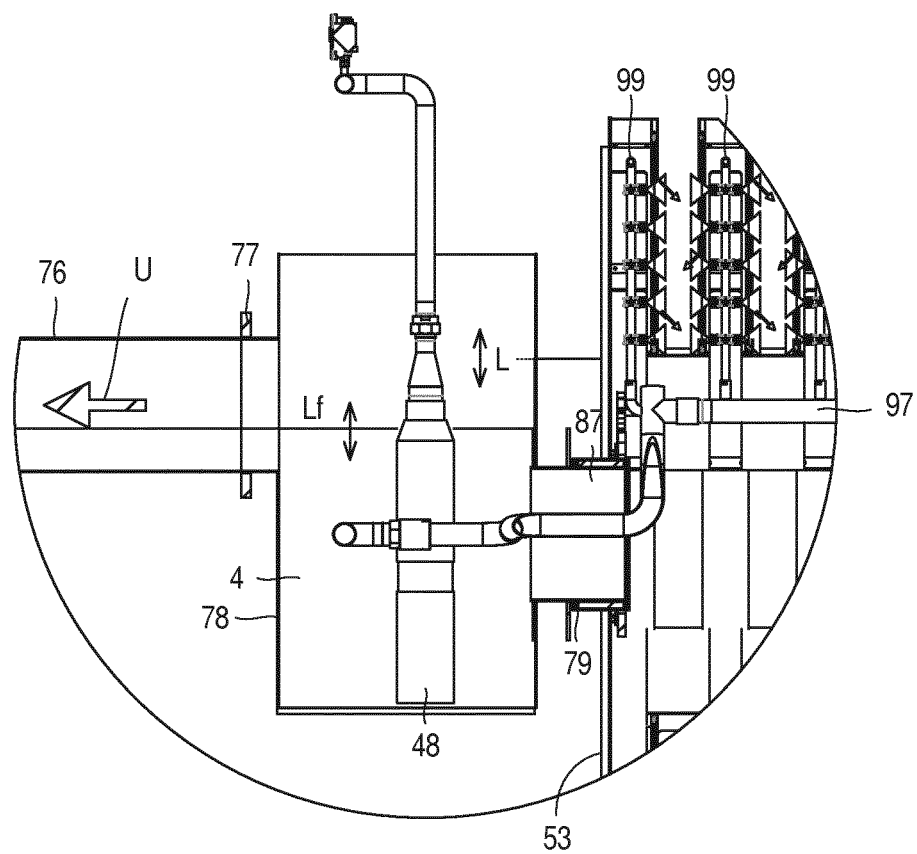
FIG. 18 is an enlarged detail circled shown in FIG. 17.

FIG. 18 shows part of the structure 50 in greater detail.

Referring to FIGS. 17 and 18, the structure 50 formed by two circular end plates 53 which are mounted on external supports 79, 80 that are rotatable about an axis x by means of an arrangement 81 of geared motor 47 and transmission. The external 79, 80 are located at the apertures 87 placed centrally on the circular end plates 53 to create the two opposite outflows U for filtered water. Clearly, in the case of a single outlet U, a single aperture 87 on a single end plate is sufficient. For simplicity, this embodiment is not illustrated.

A plurality of discs 31 are fixed coaxially to the two circular end plates 53. The discs 31, in plan view, take the shape of a circular ring with an inside radius r and an outside radius R.

Each disc 12 carries, between the inside radius r and the outside radius R, a multiplicity of filter sectors 9, facing one another and delimiting an internal disc compartment 84 which is closed peripherally on the outside radius R by a cylindrical sleeve 52 and is open on the inside radius r towards a common inner space 35 formed by cylindrical portions 54 that separate one disc from another.

Each filter sector 9 comprises, on a support frame, a fabric, mesh, or substrate or filtering material having pores or apertures in the range from 2 to 40 µm. Including manufacturing tolerances, the pores have size of 2±1 µm, 4±1 µm, 6±1 µm, 8±1 µm, 10±1 µm, 12±1 µm, 14±1 µm, 16±1 µm, 18±1 µm, 20±1 µm, 22±1 µm, 24±1 µm, 26±1 µm, 28±1 µm, 30±1 µm, 32±1 µm, 34±1 µm, 36±1 µm, 38±1 µm, or 40±1 µm.

Tests were conducted for the filtering machine using filter sectors 9 having different pore sizes. The resulting flux and filtrate quality (expressed in terms of TSS) are set out in Table B below.

TABLE B

| Pore size, P | Flux, F | Filtrate quality (TSS) |
| --- | --- | --- |
| P < 10 µm | Reduced flux rate | <2 mg/L |
| 10 µm ≤ P ≤ 20 µm | Flux up to 4000 L/h/m$^2$ | <5 mg/L |
| P > 20 µm | Flux > 4000 L/h/m$^2$ | <10 mg/L |

The fabric or filtering material is chosen from the group including polyester, polyethylene, PTFE, stainless steel, nylon.

In FIG. 17, arrows ar indicate the liquid 2 to be filtered, the level of which in the vessel is identified by L.

Air bubbles 7 are supplied from the air feeders 6 (FIG. 16). The air bubbles 7 can be macro bubbles, micro bubbles or nano bubbles. It should be noted that the liquid 2 to be filtered could be other than waste water. The feed of air bubbles 7 creates turbulent motion outside the filter 8. This motion can help to stabilize the thickness of the sludge layer 14 (FIG. 1) that is formed on the outer surface of the filter sectors 9 and the flow rate that can be achieved by the filter 8. The filtered water 4 has a level Lf which can rise in tube 76.

The supply system 75 for supplying filtered water includes a reservoir 78 communicating with the inside of the filter 8 via the aperture 87. It should be understood that the level Lf of the filtered water in the reservoir 78 is the same as the level of the filtered water inside the disc 31. This is because the outflow of filtered water, which flows by gravity from the aperture 87, is caused by the fact that the lower edges of the outer filtrate outlet tubes, which are oversized relative to the flow rate and therefore practically empty, determine the level of the filtered water Lf and simultaneously determine the inside level, which is the same. When the filter is immersed in the vessel 5, the level of filtered water Lf is below the level L of the water by an amount dependent on the dimensions of the filter. This difference in level causes the water to move from the inside to the outside of the filter. Substantially at the time of immersion of the machine in the vessel, a hydraulic differential-pressure is generated inside the vessel, causing the water to pass through the filtering membranes.

Normally, the liquid 2 to be filtered contains suspended solids with a concentration from 1 g/L to 40 g/L or even 50 g/L TSS.

The distance between the level L of the liquid 2 to be filtered in the vessel 5 and the level Lf of the filtered liquid 4 inside the rotating filter is between 0 and 0.4 m, therefore generating a reduced pressure in the same interval inside the rotating filter. On the filtering membranes, a deposited layer is formed with a thickness between 0 and 0.06 m.

The flux of the filtered liquid 4 is between 0 L/(m²h) and 5000 L/(m²h) with a suspended solid content in the filtered liquid 4 between 0 and 10 mg/L.

The rotation speed of the discs is between 0 and 1.047 rad/s (10 rpm).

The number of discs 31 is chosen in the interval between 1 and 40, and their outside diameter in a range between 0.5 m and 4 m.

Figure 19:
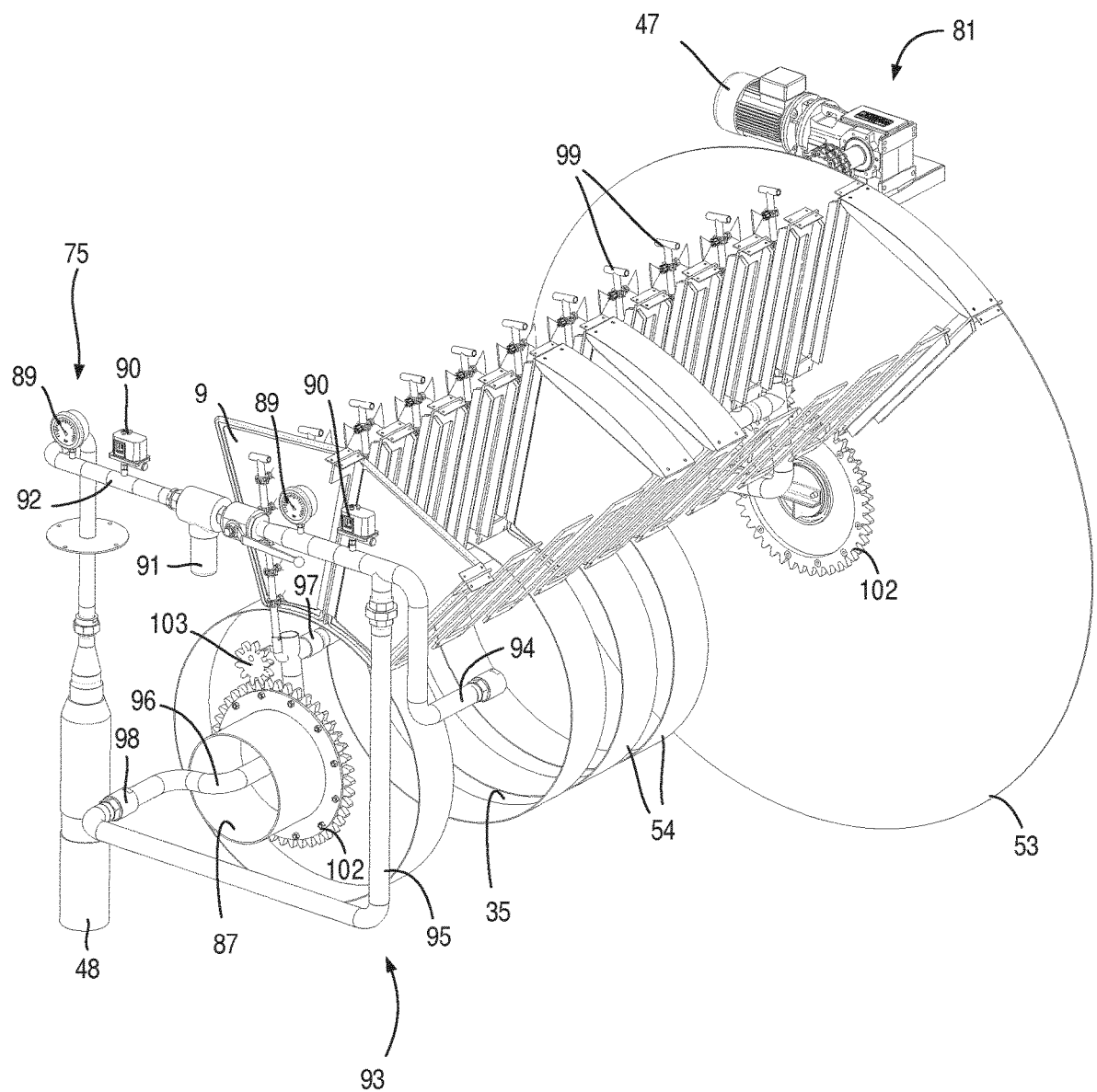
FIG. 19 is a perspective view of the rotating disc filter shown in FIG. 17 with parts removed for clarity of illustration.
Figure 20:
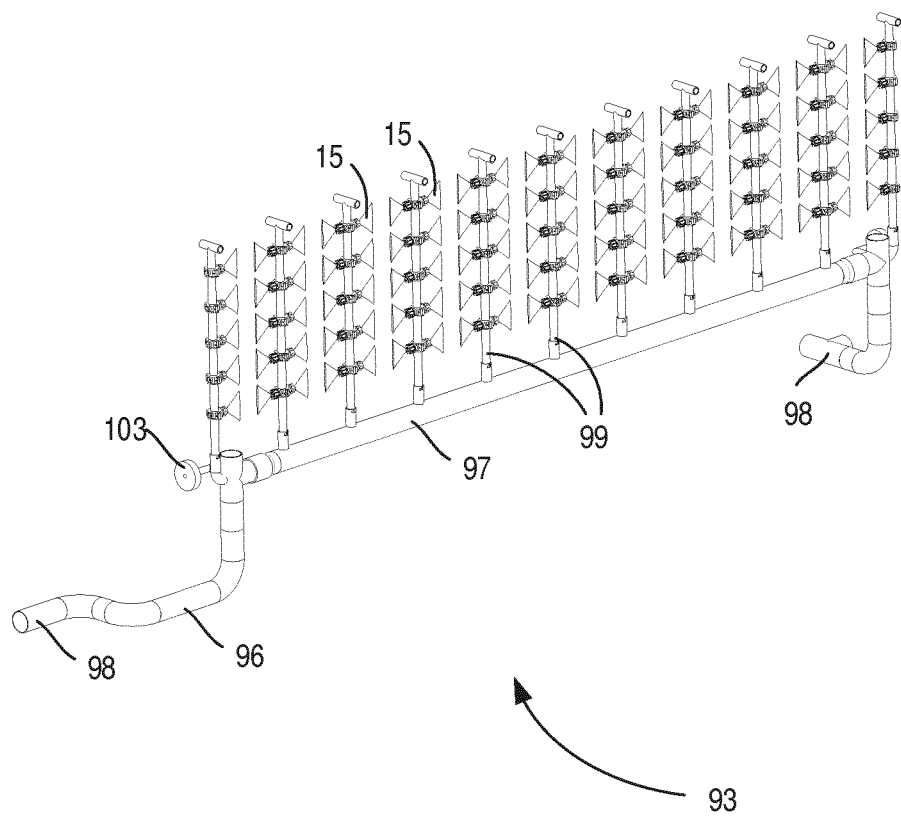
FIG. 20 is a perspective view of the backwash apparatus shown in FIG. 19 with parts removed for clarity of illustration.

FIGS. 19 and 20 show the supply system 75 for supplying filtered water for washing operations. FIG. 16 is a perspective view of the rotating disc filter with parts removed for clarity of illustration.

Referring to FIGS. 19 and 20, the supply system 75 comprises a pump 48 immersed in the reservoir 78 with its lower end below the level Lf of the filtered water 4.

The supply system 75 for supplying filtered water 4 includes, as well as the pump 48, a series of instruments for its operation, namely pressure gauges 89, pressure switches 90, a cartridge filter 91, provided on a transverse length of tube 92, which runs to the backwash apparatus 93 and to a longitudinal supply tube 97 of the washing apparatus hereinafter described.

The backwash apparatus comprises a first 'L'-shaped connector 95, leading to a second 'L'-shaped connector 96, which in turn leads to a backwash connecting tube 97 passing through the common inner space 35 and mounted oscillatably about a support 98 on the second 'L'-shaped connector 96. The support 98 is at the opposite ends of the filtering machine 8, near its circular end plates 53. The connecting tube 97 is coaxial with the axis x of the structure 50 of the filtering machine 8 (FIG. 17). The circular end plate 53 is shown without any filter sector.

A plurality of spray tubes 99 branches orthogonally from the backwash connecting tube 97 and extend inside the internal disc compartment 84. An optional oscillation device may be provided on each of the circular end plates 53 (only one of which is shown in FIG. 16) on the second 'L'-shaped connector 96 near the connecting tube 97, to cause the rotation of the backwash connecting tube 97, and therefore of the spray tubes 99 about the supports 98 which are coaxial with the axis x.

The arrangement of the backwash apparatus 93 described above is shown more clearly in the perspective view of FIG. 17. In this figure it can be seen more clearly that each spray tube 99 (FIG. 19) has a plurality of opposed nozzles 15 (FIG. 1) directed towards the filter sectors 9 (not shown in FIG. 20).

Figure 21:
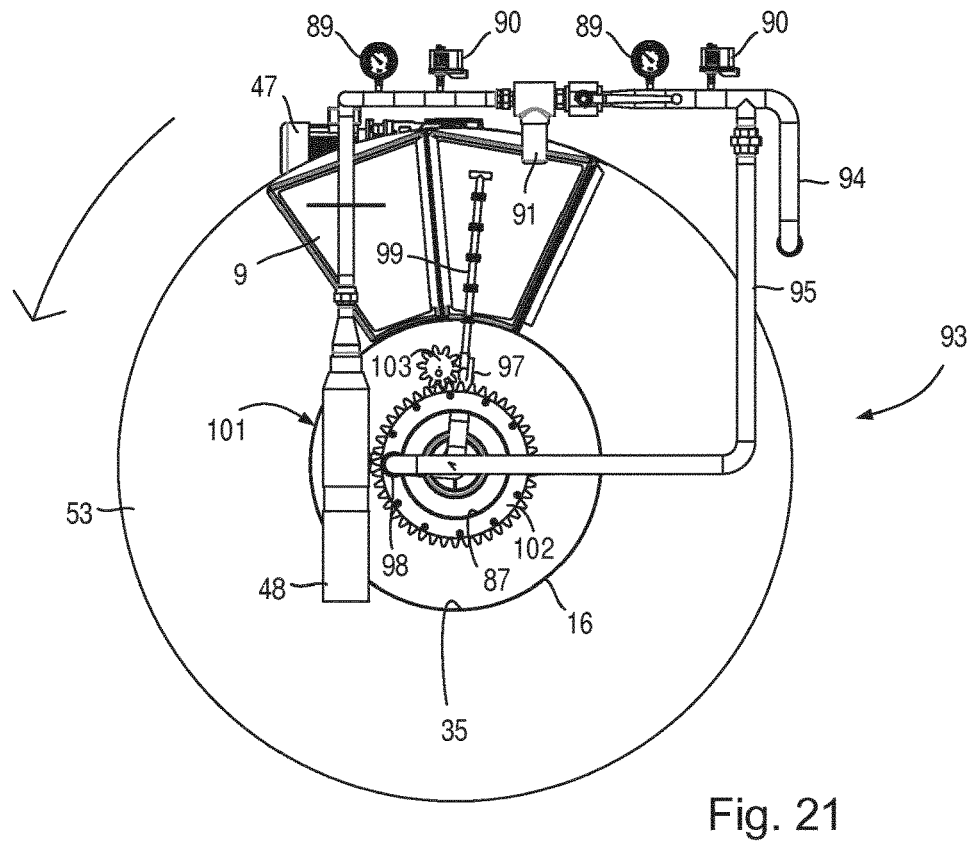
FIG. 21 is a left end view of the rotating disc filter shown in FIG. 19, showing the backwash apparatus in a first position.
Figure 22:
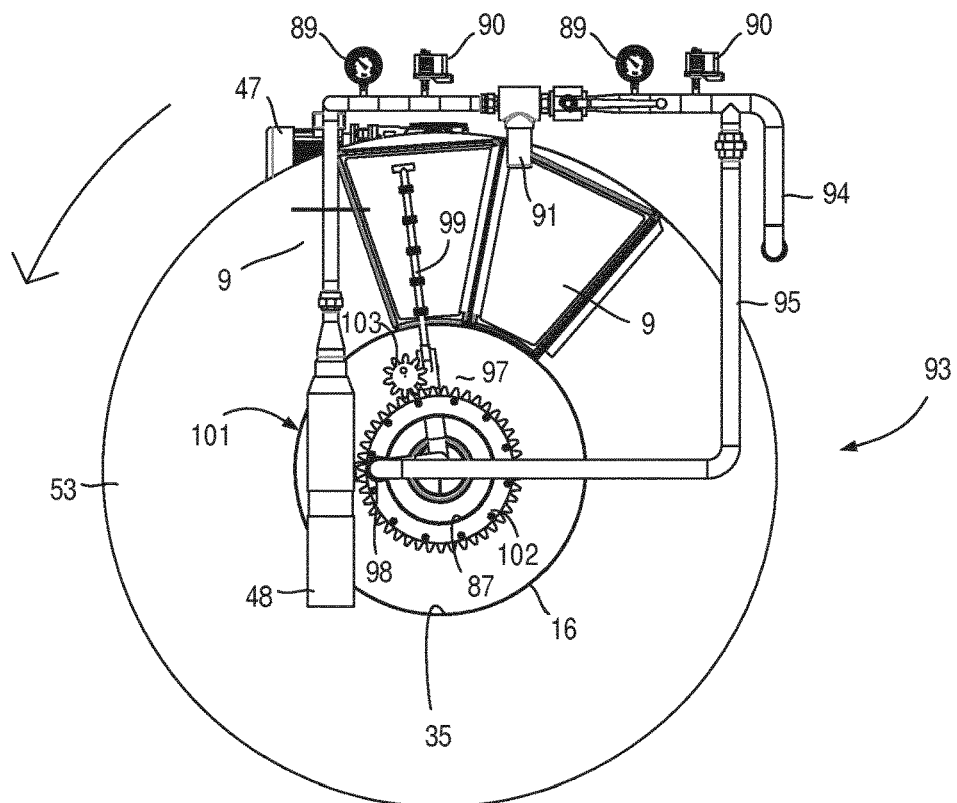
FIG. 22 is a left end view of the rotating disc filter shown in FIG. 19, showing the backwash apparatus in a second position.

FIGS. 21 and 22 are a left end view of the rotating disc filter showing the backwash apparatus 93 in first and second positions respectively.

A device 101 for oscillating the backwash connecting tube 97 is optionally provided at the aperture 87 communicating with the common inner space 35.

The oscillating device 101 comprises a ring gear 102 mounted in a fixed way on the outer surface of the aperture 87. The ring gear 102 engages with an eccentric pinion 103 mounted rotatably on the backwash apparatus near the backwash connecting tube 97. It should be understood that the anticlockwise rotation of the structure 50 of the filter 8 results in a rotation of the eccentric pinion 103 in the opposite direction, causing the backwash connecting tube 97 to have an oscillatory movement around the support 98 into the two positions shown in FIGS. 21 and 22. This is a movement produced by a toothed cam and an eccentric cam follower. As a result of this oscillatory movement, the jets of filtered water from the nozzles 15 of the spray tubes 99 do not always strike the filter sectors 9 at the same point but provide a backwash effect over substantially the whole surface of these sectors. To achieve this, the numbers of teeth of the pinion and the ring gear are chosen in such a way that there are prime numbers among them (i.e., they had no common factors). Thus, the nozzles do not pass through the same point, thereby helping to avoid or prevent formation of stripes on the membranes of the filter sectors.

Figure 23:
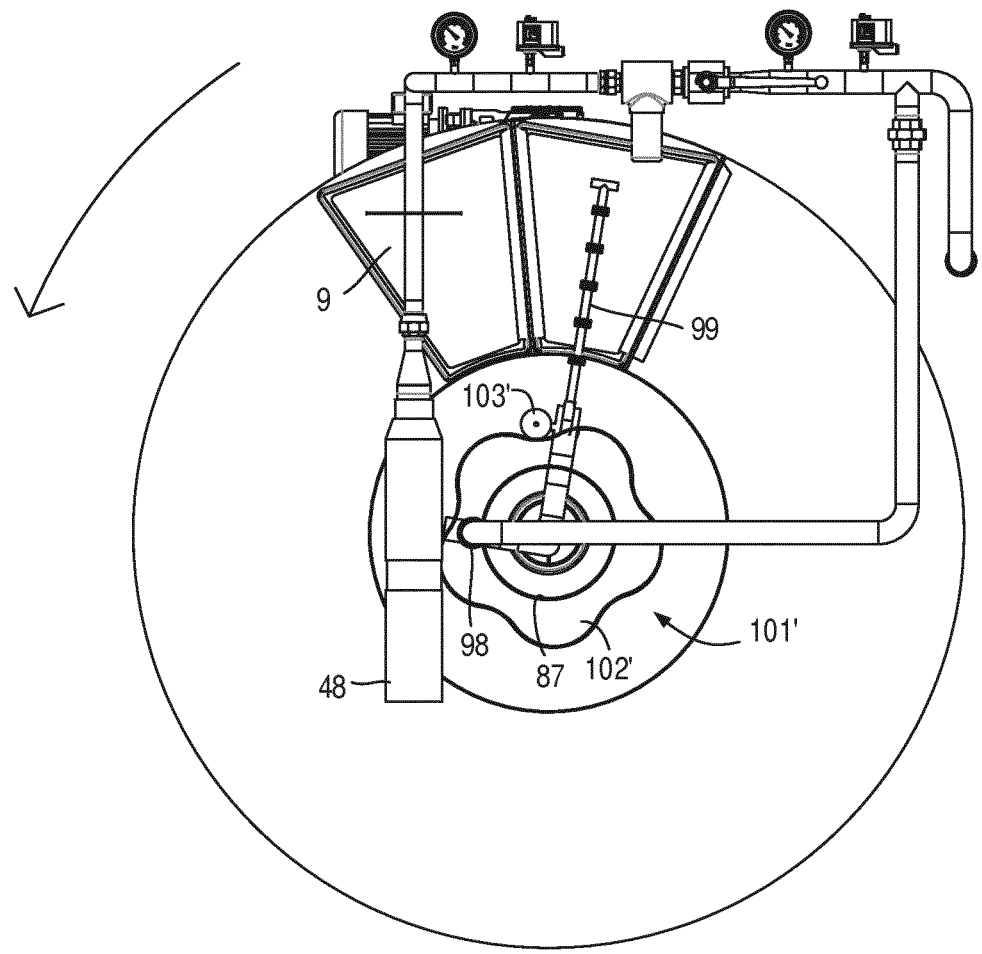
FIG. 23 is a left end view of the rotating disc filter.

Referring to FIG. 23, a variant of the backwash apparatus is shown.

The variant of the backwash apparatus differs from the backwash apparatus hereinbefore described by virtue of a cam and cam follower oscillation device 101'. In this variant, the cam is a lobed cam 102', and the cam follower is a roller 103' which, by following the lobed cam 102', causes the same oscillation of the backwash connecting tube 97. In this variant, the lobed cam 102' is mounted in a fixed way on the aperture 87, and the roller cam follower 103' is mounted rotatably on the backwash apparatus 93 near the backwash connecting tube 97.

Figure 24:
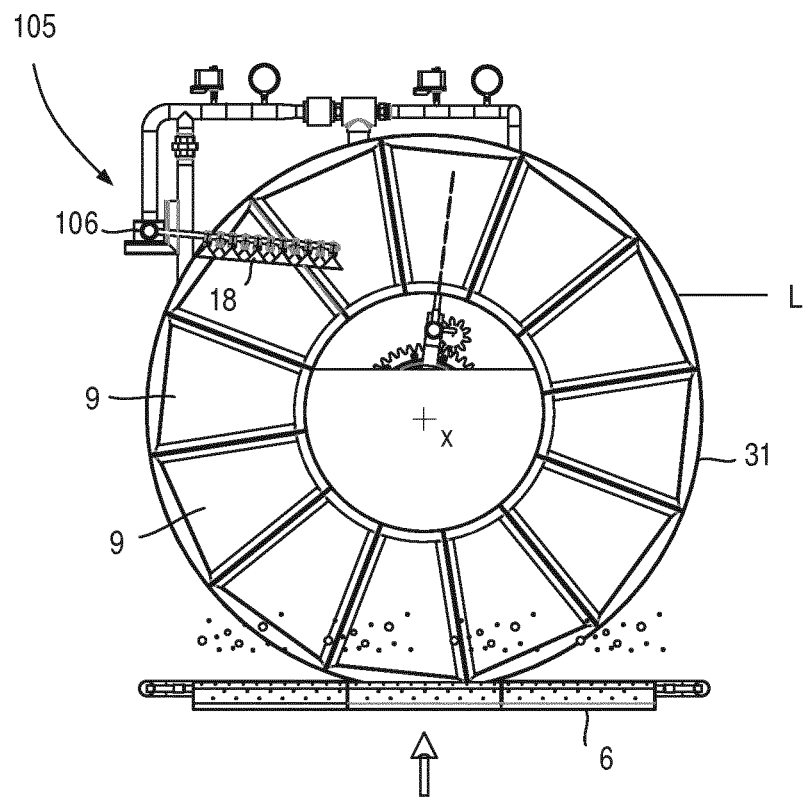
FIG. 24 is a left end view of the rotating disc filter shown in FIG. 19, showing a disc washing apparatus.
Figure 25:
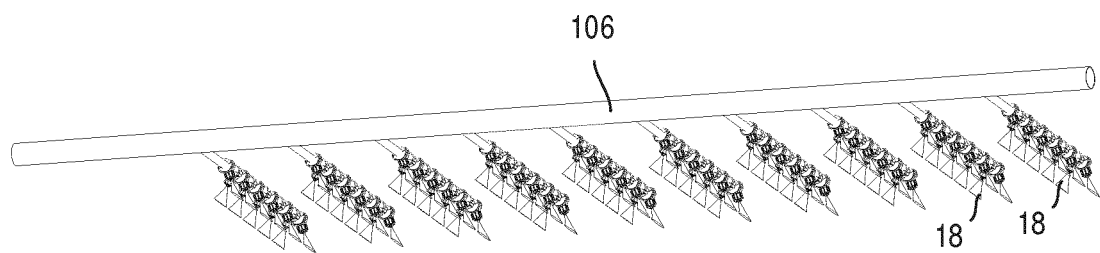
FIG. 25 is a perspective view showing spray tubes of the disc washing apparatus shown in FIG. 24.

FIG. 24 is a left end view of the rotating disc filter showing an external disc washing apparatus. FIG. 25 is a perspective view of the spray tubes of the disc washing apparatus.

Referring to FIGS. 19, 21 and 22, the supply system 75 for supplying filtered water 4 has an extension 94, downstream of the branch into the first 'L'-shaped connector 95. The extension 94 is used to supply a washing apparatus 105 (FIG. 24) comprising a washing connecting tube 106, mounted outside the structure 50 of the filter 8 parallel to the axis x, and a plurality of spray tubes 18 joined to the washing connecting tube 106 and extending at least singly between one disc 31 and another of the structure 50, to act externally on the filter sectors 9 with tangential water jets directed downwards. Washing precedes the backwash. The resulting effect is that the layer of sludge adhering to the outer faces of the filter sectors is removed as soon as they emerge from the water to be filtered, due to the rotation of the discs, while exerting a very low pressure perpendicularly on the filter sectors. This can considerably increase the effectiveness of the subsequent backwash, which has the purpose of freeing the pores of the filter sectors from any impurities that may have obstructed them. The tangential washing, as well as the backwash, uses or may use the filtered water drawn by a pump from one of the outlet reservoirs.

The feed of air bubbles creates turbulent motion outside and in the immediate vicinity of the filter sectors. This motion can help stabilize the thickness of the sludge layer that is formed on the outer surface of the filter sectors and the flow rate that can be achieved by this type of thickening filter. It can also ensure the quality of the filtered water by hydrodynamic filtration. The rotary motion of the discs creates a hydraulic/centrifugal thrust of the thickened sludge towards the inside of the vessel.

Filtering Apparatus

Figure 26:
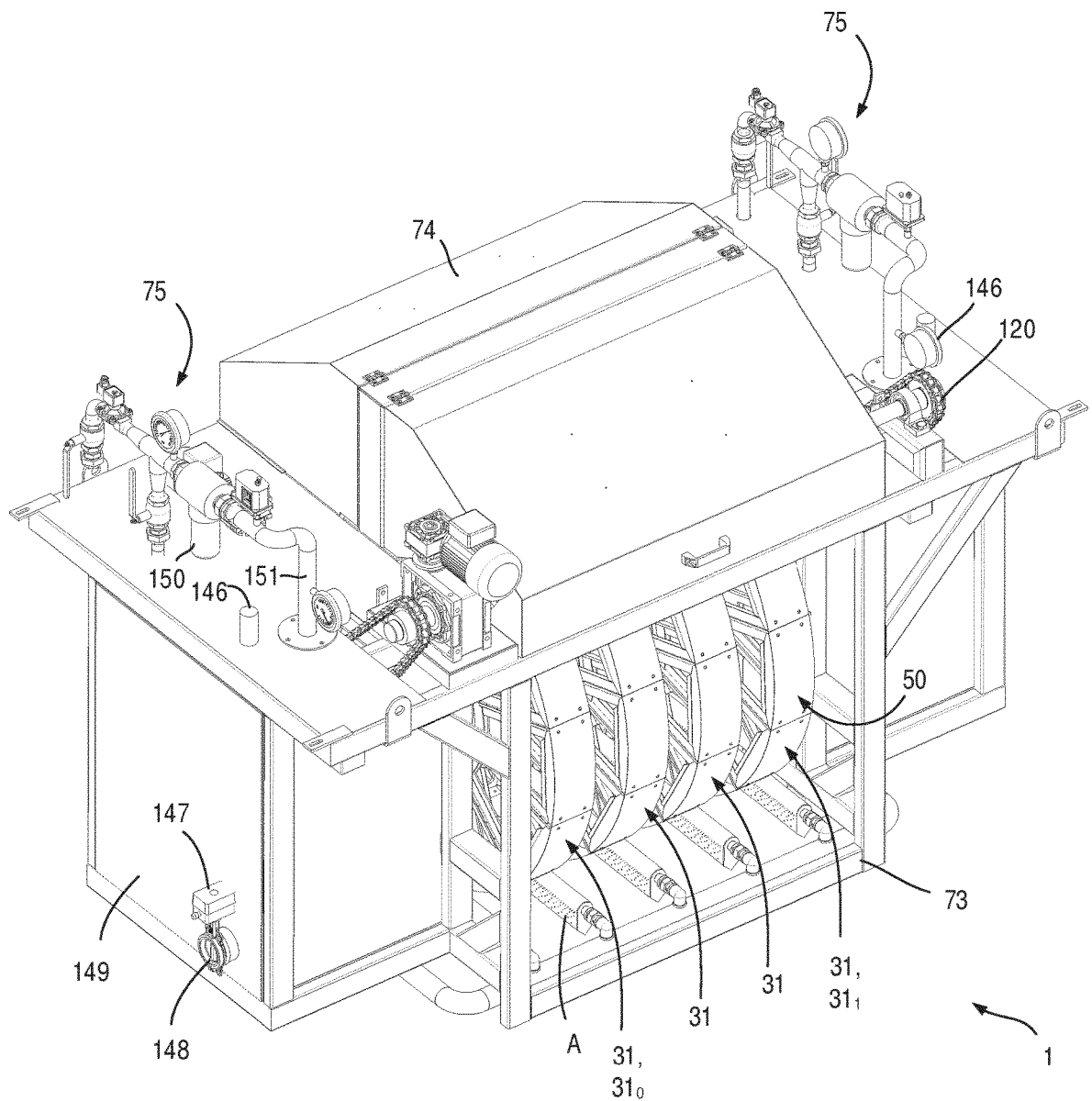
FIG. 26 is a perspective view of a thickening filtering machine.
Figure 27:
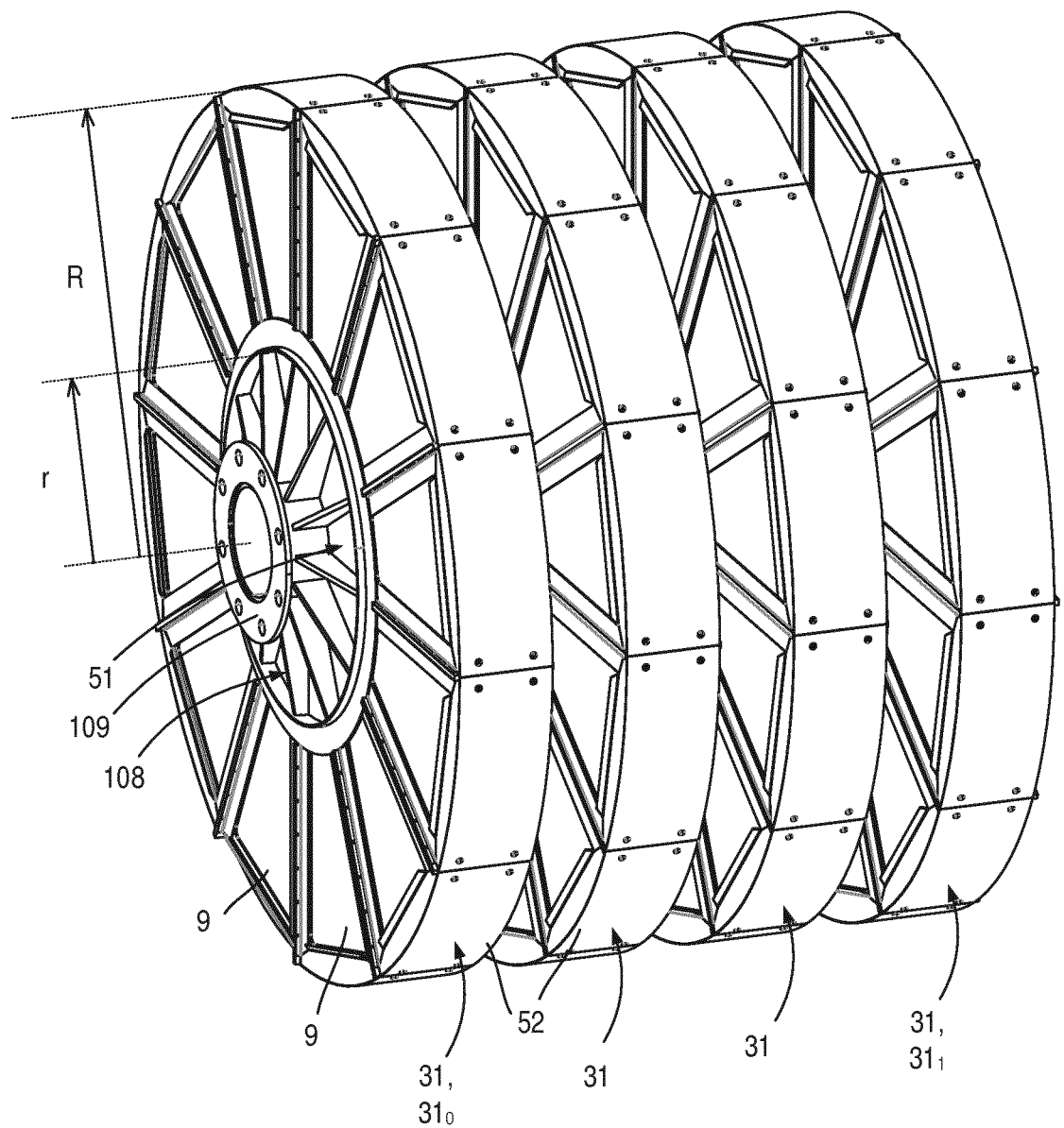
FIG. 27 is a partial prospective view of the disc structure of the machine of FIG. 26.
Figure 28:
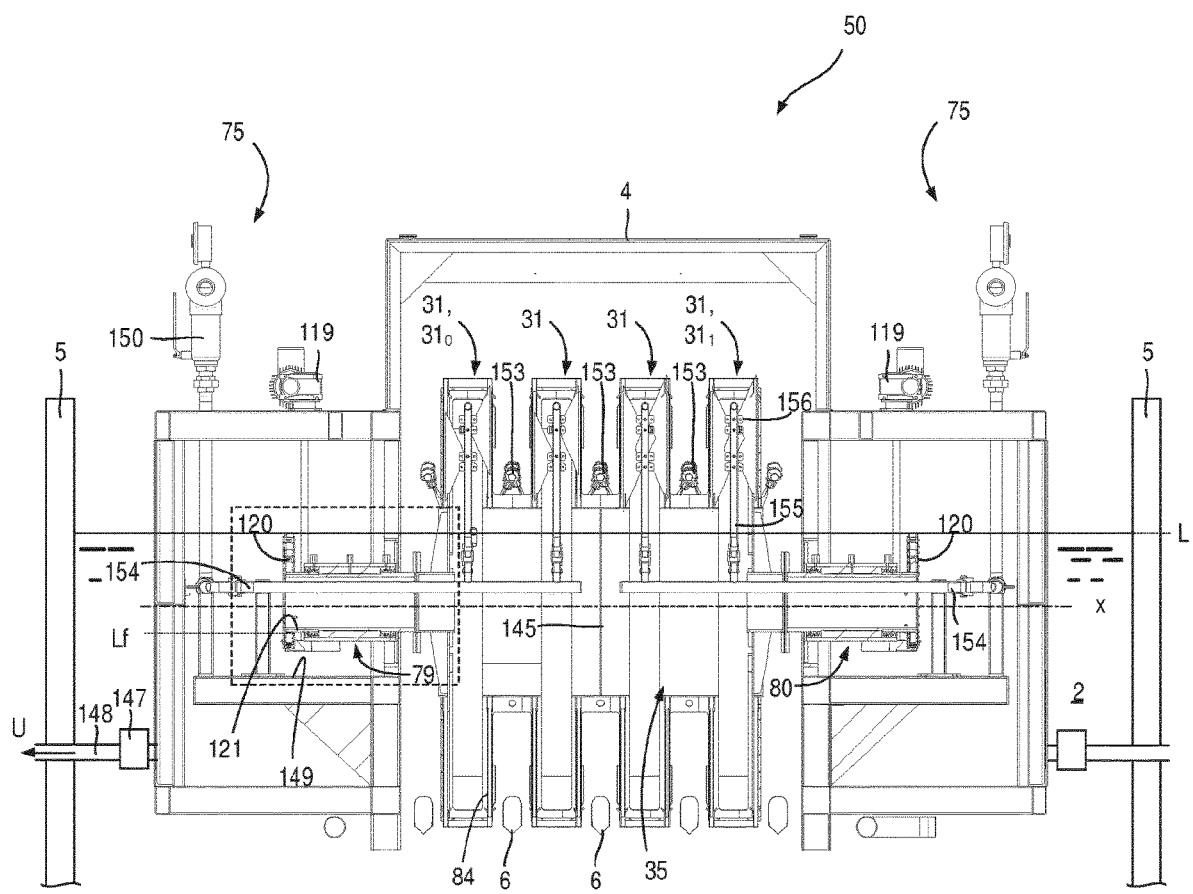
FIG. 28 is a longitudinal section of the machine of FIG. 26 immersed in a vessel (not shown)

FIG. 26 is perspective view of a second example of rotating disc filtering machine 8 for filtering a liquid 2. The second rotating disc filter 8 is similar to the first example of rotating disc filter 8 except that there are four discs 31. FIG. 27 is a partial perspective view of the disc structure 50. FIG. 28 is a longitudinal section of the machine immersed in a vessel.

Referring to FIGS. 26 to 28, the filter structure 50 comprises a plurality of discs 31 including first and second end discs $31_0$, $31_1$. The discs 31 take the form of a circular ring with an inside radius r and an outside radius R. The number of discs is in the interval from 1 to 40, and their diameter from 0.5 m to 4 m. When the number of discs is one, the machine could be called a drum machine.

The end discs $31_0$, $31_1$ comprise a circular end plate 51, reinforced with radially arranged supports 108 confluent (i.e., "merging") into a flange aperture 109. Each disc 31 carries, between the inside radius r and the outside radius R, a multiplicity of filter sectors 9, facing one another and delimiting an internal disc compartment 84. The internal disc compartment 84 is closed peripherally on the outside radius R by a cylindrical sleeve 52 and is open on the inside radius r towards a common inner space 35 formed by cylindrical portions 54 (FIG. 19) that separate one disc from another.

Figure 29:
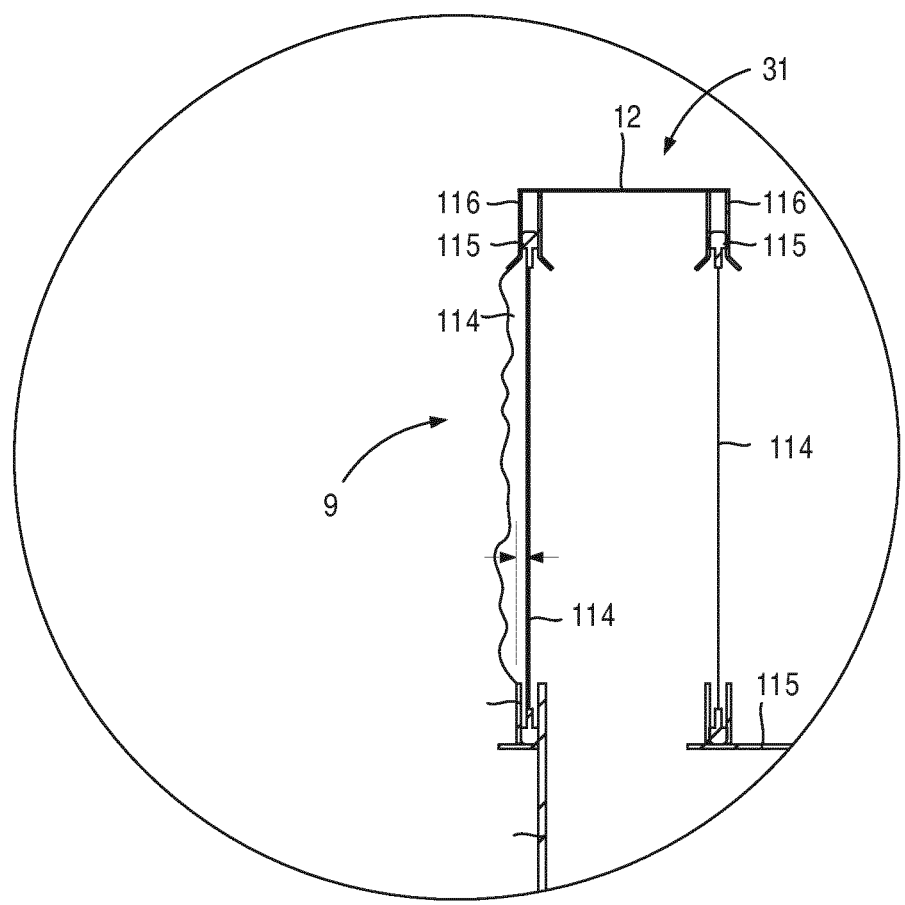
FIG. 29 is an enlarged schematic detail of a portion of the disc shown in FIG. 28.

FIG. 29 is an enlarged schematic detail of a portion of an end disc 31.

Referring to FIG. 29, the filter material 114 made of mesh or substrate or other filtering material is thicker at its periphery in an edge 115 that is received and hold in a trapezoidal frame 116. On the side of the filter material 114 facing the outside of the disc 31, but also on the same side of the other discs, a cake or layer 14 is formed, deposited on the fabric or filtering material with a thickness between 0 and 0.06 m. The trapezoidal frame 116 that holds the filter sectors 9 in the disc, generally having a width of 0.007 m, allows the deposition of the thickened layer or cake that takes part in the filtration increasing its effectiveness. Additionally, the cake thickness is one of the factors that affect the output flux of the machine 8. A peculiar converging shape of the edges allows the cake to stay in position countering the effect of the rotation of the disc and of the gravity pull. The thickness of the cake is controlled by a control unit that measures the outgoing flow and the level of water to be filtered in the vessel 5 and determines the intensity of the aeration with macro-bubbles, micro-bubbles, and nano-bubbles in the vessel 5.

The circular end plates 51 are mounted on an external support 79, 80 (FIG. 28) and can be rotated around an axis x preferentially by means of two gearboxes 119 and power transmission shaft 120 groups represented only schematically at the opposite ends of the machine along the x axis. There is provision for a number of two groups to share the rotation load of the filter structure 50 and to obtain a more balanced rotation.

Figure 30:
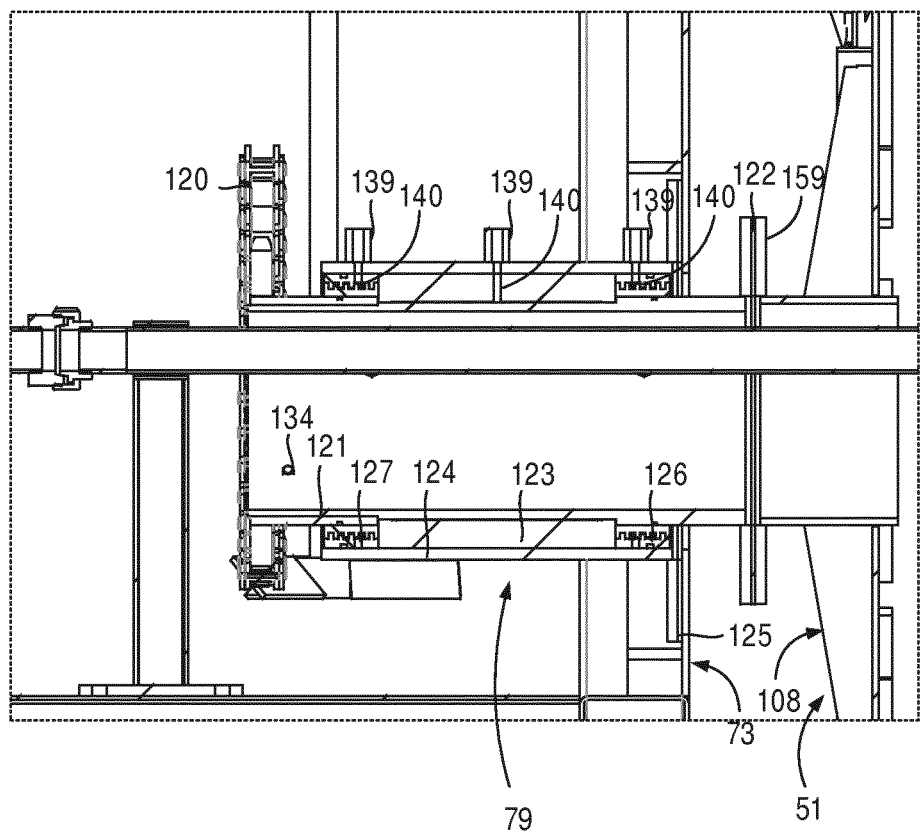
FIG. 30 is an enlarged schematic detail of a support.

FIG. 30 is an enlarged view of the external support 79.

Referring to FIG. 30, the external support 79 (and, likewise, the other external support 80) supports an outflow aperture 121 as a tubular joint connected by a first flange 122 to the flanged aperture 159 of the own circular end plate 51. The external support 79 has preferentially a sliding friction or bushing 123 in a bushing-bearing sleeve 124 that is welded to a second flange 125 joined to the frame of the machine. The bushing 123 is internally next to the outflow aperture 121 and has on each end a proximal labyrinth seal 126 and a distal labyrinth seal 127. The labyrinth seals are coaxial to the outflow aperture 121 and to the bushing-bearing sleeve 124.

Figure 31:
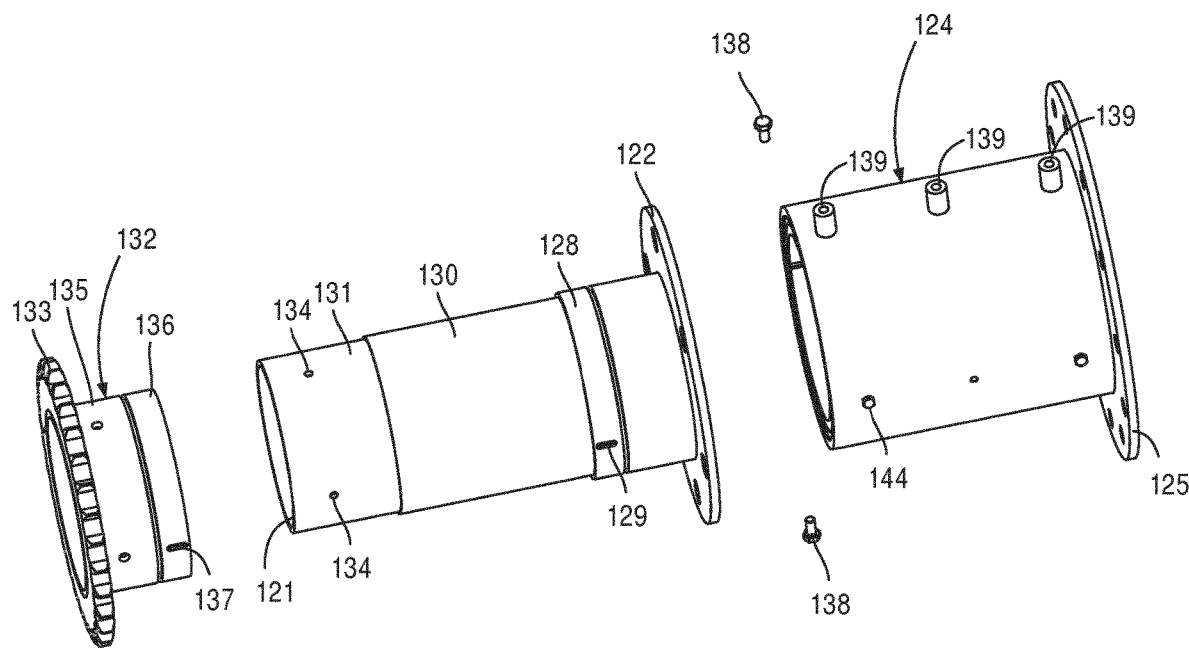
FIG. 31 is an exploded perspective view of the support shown in FIG. 30 with some parts removed for clarity of illustration.
Figure 32:
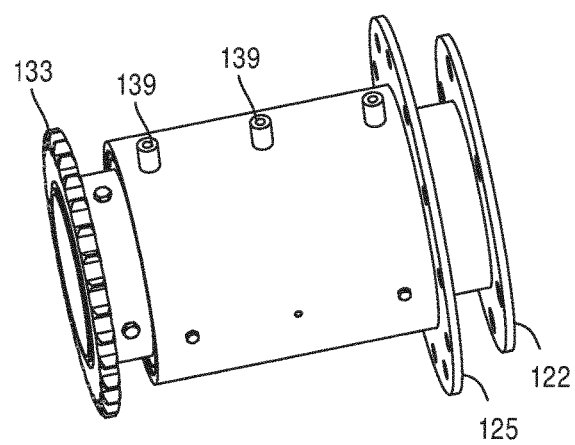
FIG. 32 is a perspective view of the assembled support shown in FIG. 31 with some parts removed for clarity of illustration.

FIGS. 31 and 32 are an exploded and an assembled perspective view of the external support 79 with some parts omitted for the sake of clarity. The outflow aperture 121 is divided into a proximal segment 128, meant to host by means of tabs 129 the proximal labyrinth seal 126, an intermediate segment 130 externally adjacent to the bushing 123 and a connection segment 131, meant to be inserted in a separate segment 132, on which a gear 133 is fitted being part of the power transmission shaft 120 (FIG. 30). The connection segment 131 and the separate segment 132 are solidly connected by means of threaded couplings 138 in corresponding holes 134, 135. On the separate segment 132 a distal segment 136 is present, meant to host by means of tabs 137 the distal labyrinth seal 127. On the external sleeve 124, greasing nozzles 139 are provided, connected by means of channels 140 to the space internal to the distal and proximal labyrinth seals 126, 127 and with the inner part of the bushing delimited by the outflow aperture 121. On the outflow aperture 121, hard stops, not described in detail, are provided to stop the bushing 123 and the labyrinth seals 126, 127.

Figure 36:
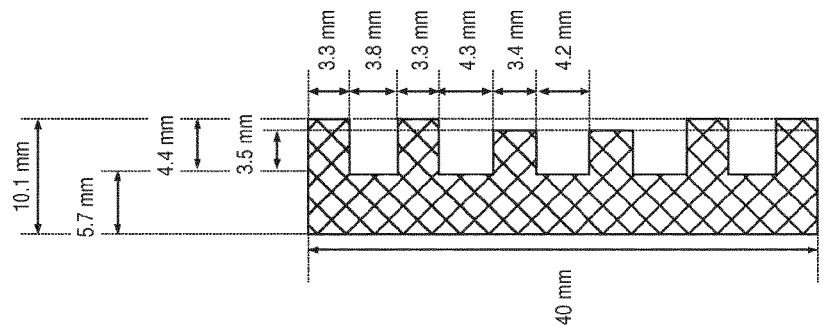
FIG. 36 is an enlarged detail of the element shown in FIG. 35.
Figure 35:
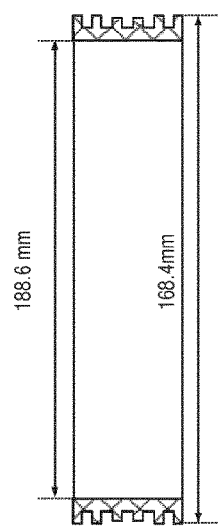
FIG. 35 is a section of the element shown in FIG. 34 taken along the line A-A.
Figure 34:
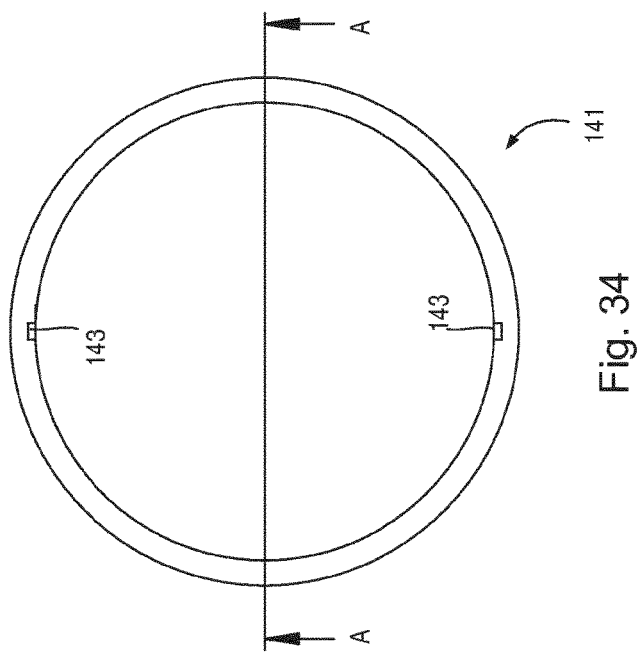
FIG. 34 is an end view of the sealing labyrinth-shaped internal element in FIG. 33.
Figure 33:
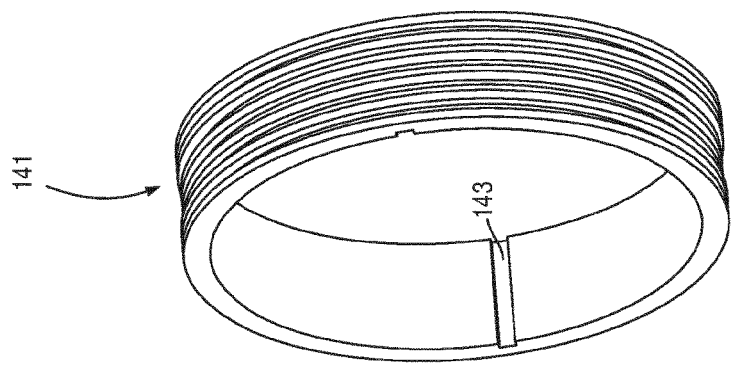
FIG. 33 is a perspective view of a sealing labyrinth-shaped internal element in the support shown in FIG. 30.
Figure 39:
FIG. 39 is a section of the element shown in FIG. 38 taken along the line B-B.
Figure 38:
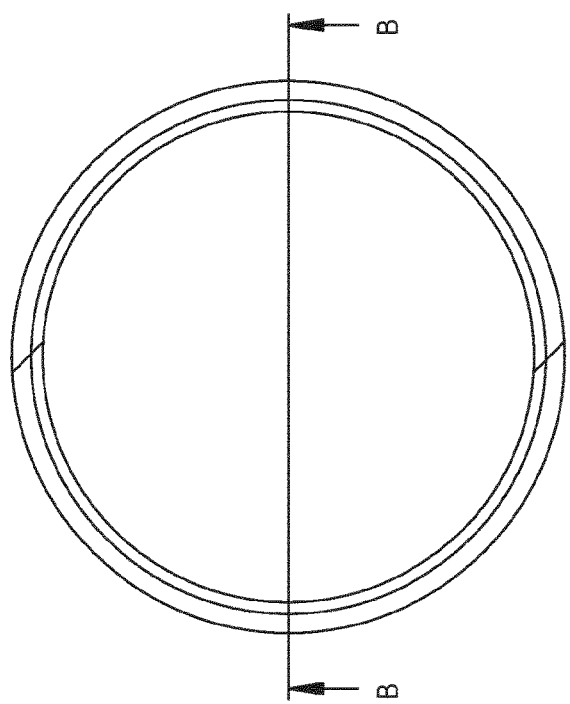
FIG. 38 is an end view of the sealing labyrinth-shaped external element shown in FIG. 37.
Figure 37:
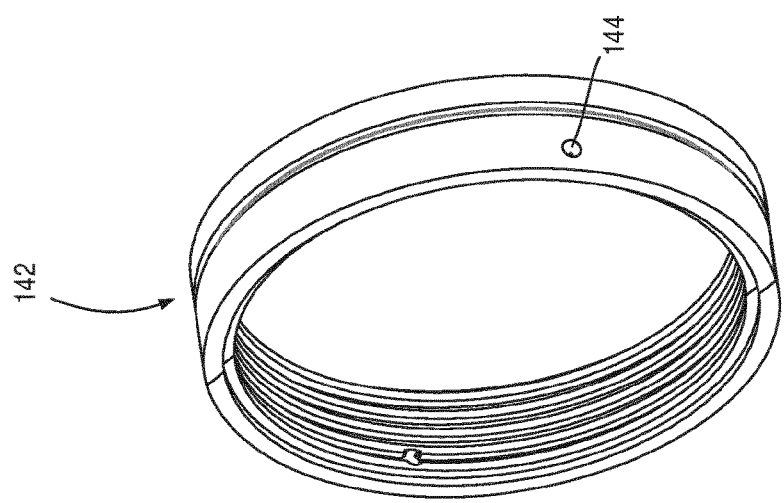
FIG. 37 is a perspective view of a sealing labyrinth-shaped external element shown in FIG. 30.

FIG. 33 is a perspective view of an internal element of the labyrinth seal. FIG. 34 is an end view of the internal element of the labyrinth seal shown in FIG. 33. FIG. 35 is a section of the internal element of the labyrinth seal taken along the line A-A and FIG. 36 is an enlarged view of the section. FIG. 37 is a perspective view of an external element of the labyrinth seal. FIG. 38 is an end view of the external element of the labyrinth seal shown in FIG. 37. FIG. 39 is a section of external element of the labyrinth seal taken along the line B-B and FIG. 40 is an enlarged view of the section.

Referring to FIGS. 33 to 40, the labyrinth seals 126, 127 are composed of coaxial grooved elements.

Each labyrinth seal is composed of the internal ring 141 with external grooves and of the external ring 142 with internal grooves. The internal ring 141 and the external ring 142 are mutually coaxial and coupled to delimit an internal space between the rings. The internal ring 141 is solidly connected to the outflow aperture 121 and to the separate segment 132 with tabs 129, 138 held by grooves 143. The external ring 142 is solidly connected to the bushing-bearing sleeve 124 by coupling means inserted in corresponding holes 144 fabricated on the external ring 142 and on the bushing-bearing sleeve 124 respectively.

Figure 40:
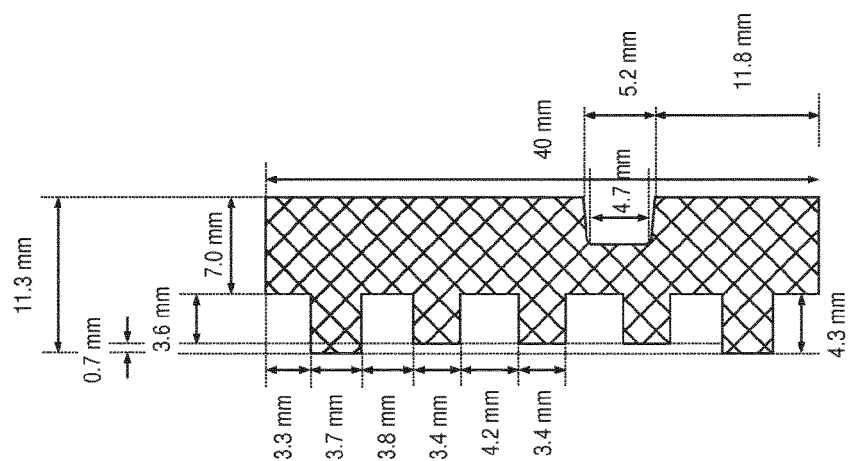
FIG. 40 is an enlarged detail of the element shown in FIG. 39.

FIGS. 36 and 40 show preferred sizes for the grooved profiles for helping to insure optimal sealing.

The internal and external rings 141, 142 are preferably made out of Teflon® for its low-friction and long-lifetime characteristics. Due to the elasticity of the material, the external ring 142 is cut so that it can be mounted on the internal ring 141 and finally the labyrinth seal group thus formed is mounted both in the support 79 and in the support 80.

Referring again to FIG. 28, the common internal space 35 of the filter structure 50 is partitioned by a wall 145 that divides it hydraulically in two separate regions. Due to this partition of the internal space, in the event of mechanical failure of a filter sector, the machine can keep operating by isolating the portion containing the disc with the ruptured filter sector. To this end, each of the two parts is provided with a respective turbidity sensor 146 (FIG. 26) to verify the turbidity of the filtered liquid 4, and motorised valves 147 to shut off the filtered liquid 4. The motorised valves 147 are positioned on the filtered liquid outflow pipe 148. Each outflow pipe 148 is connected upstream with a filtered liquid tank 149.

It should be understood that the common inner space 35 of the filter structure can be divided in more than two parts as to obtain better performances in the event of a mechanical failure of a filter sector.

The liquid 2 to be filtered contains suspended solids with a concentration from 1 g/L to 50 g/L.

The distance between the level L of the liquid 2 to be filtered in the vessel and the level Lf of the filtered liquid 4 inside the rotating filter is between 0 and 3 m, therefore generating a reduced pressure difference in the same interval inside the rotating filter. On the filtering membranes, a deposited layer is formed with a thickness between 0 and 0.06 m as said before.

The flux of the filtered liquid 4 is between 0 L/(m²h) and 5000 L/(m²h).

The suspended solid content in the filtered liquid 4 is between 0 and 50 mg/L.

The rotation speed of the discs is between 0 and 1.047 rad/s (10 rpm).

As explained earlier, feeding of air as macro bubbles, micro bubbles or nano bubbles by means of air supply 6 helps to create turbulent motion outside the filter structure 50. This motion can help to stabilize the thickness of the sludge layer 14 that is formed on the outer surface of the filter sectors 9 and the flow rate that can be achieved by filter structure 50.

On both ends of the filtering machine 8, a supply system 75 is provided for supplying filtered water 4, contained in the reservoir 149 communicating with the inside of the filter structure 50 via the outflow aperture 121 (FIG. 30). It should be understood that the level Lf of the filtered water in the reservoir 149 is the same to the level of the filtered water inside the filter structure 50. When the filter is immersed in the vessel 5, the level of filtered water Lf is below the level L of the water to be filtered by an amount dependent on the dimensions of the filter structure 50. Substantially at the time of immersion of the machine in the vessel, a hydraulic differential-pressure is generated inside the vessel, causing the water to pass through the filter sectors 9.

Figure 41:
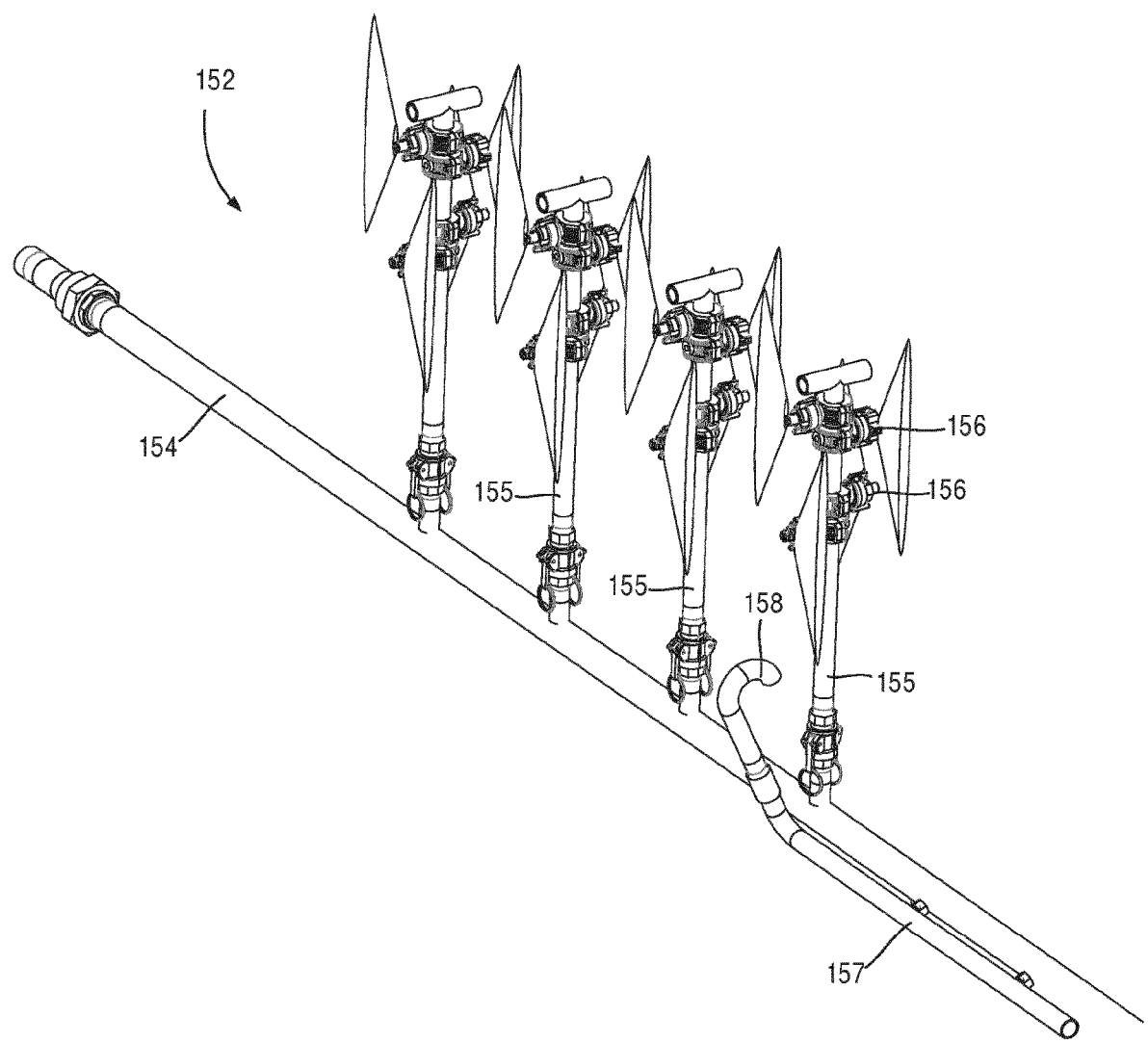
FIG. 41 is a perspective view of the backwash apparatus shown in FIG. 19 with the addition of a pressure compensation tube.
Figure 42:
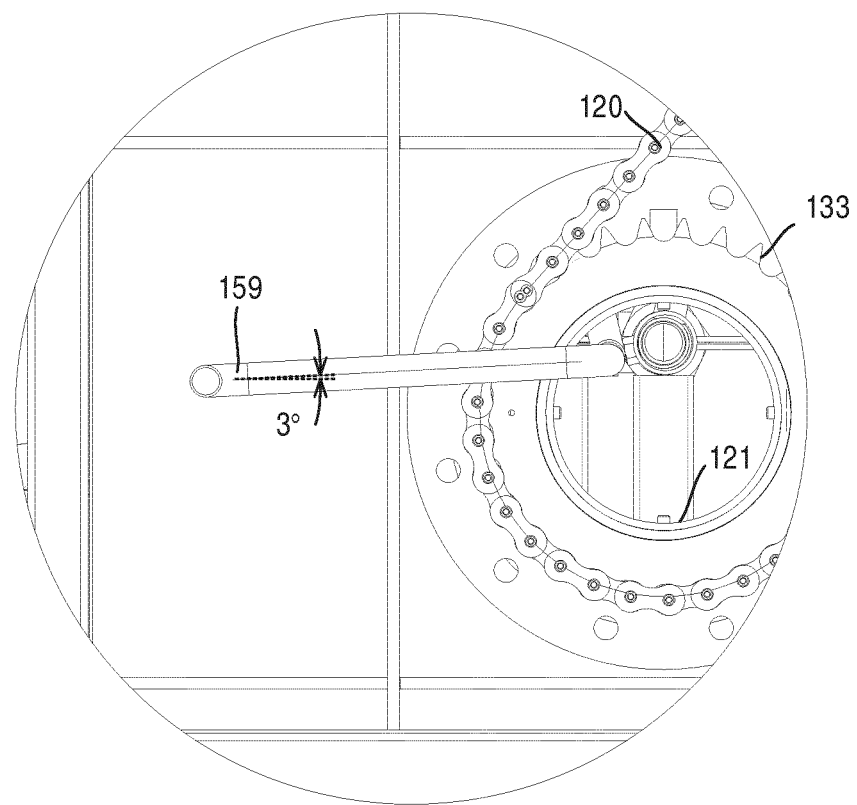
FIG. 42 is an end view showing the pressure compensation tube shown in FIG. 41.

FIGS. 26 and 28 also show the supply system 75 for supplying filtered water for washing operations. The supply system 75 comprises a pump 150 immersed in the reservoir 149 with its lower end below the level Lf of the filtered water 4. It may be seen that the supply system 75 for supplying filtered water 4 includes, as well as the pump 150, a series of instruments for its operation, including a cartridge filter. These instruments are provided on a transverse length of tube 151, leading to a backwash apparatus 152 (FIG. 41). A washing apparatus 105 is also provided with nozzles 153 (FIG. 28) positioned externally to the discs above the level L of the liquid to be filtered ar inside the vessel V.

Referring to FIG. 41, the backwash apparatus 152 includes separate tubes 154 for each part of the common inner space 35 of the filter structure 50.

A plurality of spray tubes 155 branches orthogonally from the backwash connecting tube 154 and extend inside the internal disc compartment 84. Each spray tube 155 has a plurality of opposed nozzles 156 positioned above the level L of the water or liquid to be filtered 4 and directed towards the filter sectors 9.

In case it is needed, the external washing of the discs can be activated. The resulting effect is that the layer of sludge adhering to the outer faces of the filter sectors is removed as soon as they emerge from the water to be filtered, due to the rotation of the discs, while exerting a very low pressure perpendicularly on the filter sectors. This considerably increases the effectiveness of the subsequent backwash, which has the sole purpose of freeing the pores or aperture of the filter sectors 9 from any impurities that may have obstructed them. The tangential washing, as well as the backwash, uses the filtered water drawn by a pump from one of the outlet reservoirs.

Depending on the liquid to be filtered it might be advantageous to keep a deposited layer on the filter material 114 of the filter sector 9. It is important that the filter material 114 is not forced to become concave towards the inner space of the disc on the frame 116 of the filter sectors 9. To address this issue, due to the outflow of filtrate but accentuated by the washing of the cloth and by the lowered pressure created in the inner space 83 of the discs, a pressure-compensating tube 157 is provided, that connects the inner space 83 of each disc with the atmosphere external to the machine. The pressure-compensating tube 157, which has a bent internal end 158, has in the vicinity of the outflow aperture 21 a slight sloping length 159, preferably sloping 3° with respect to the horizon, which can help with drainage. This connection with the outside environment allows to increase the inner pressure and reduce the concavity of the filter material 114 of the filter sector, which could lead to reduced performances and possibly to the mechanical failure of the filter material 114 itself. In the case the atmospheric pressure is not enough to counter the concavity determined by the flow of the filtrate through the filter sectors, the pressure-compensating tube 157 is connected to a pump to obtain locally, for example in proximity of an internal surface of the filter material 114 of filter sector, a pressure larger than the atmospheric pressure.

Although the above description has referred to a filter disc machine, it can be implemented as a drum when the number of discs is one. Although being intended for the treatment of wastewater, it should be understood that other liquids may also be treated, and evidently the washing and backwashing are to be carried out with the filtered liquid. Embodiments of the filtering machine can act also as a thickener. By extracting filtered liquid from the vessel containing a mixture of liquid and solid or semi-solid substances, the effect of increasing the concentration of these substances in the vessel is also achieved.

Controlling Levels of Liquids

As explained earlier, the flux and the filtrate quality can be adjusted by varying the levels L, Lf of the to-be-filtered and filtered liquid 2, 4. The levels can be varied independently of each other.

Referring to FIGS. 9, 17 and 18 and also to FIGS. 43 to 47, the level, L, of the to-be-filtered liquid should not increase above a maximum level, Lmax, which corresponds to the inner radial part of the filter element 9 (FIG. 9) or the top of cylindrical portion 54 (FIG. 17) since this may hinder the ability of the backwash apparatus 93 (FIG. 20) to clean the filter element 9 properly.

The filtrate level, Lf, can be controlled so that it lies between a minimum level, Lfmin, and a maximum level, Lfmax, using a number of different arrangements.

Referring to FIG. 18, the bottom of the pipe 76 may serve as a weir which can be used to control the level Lf.

Figure 43:
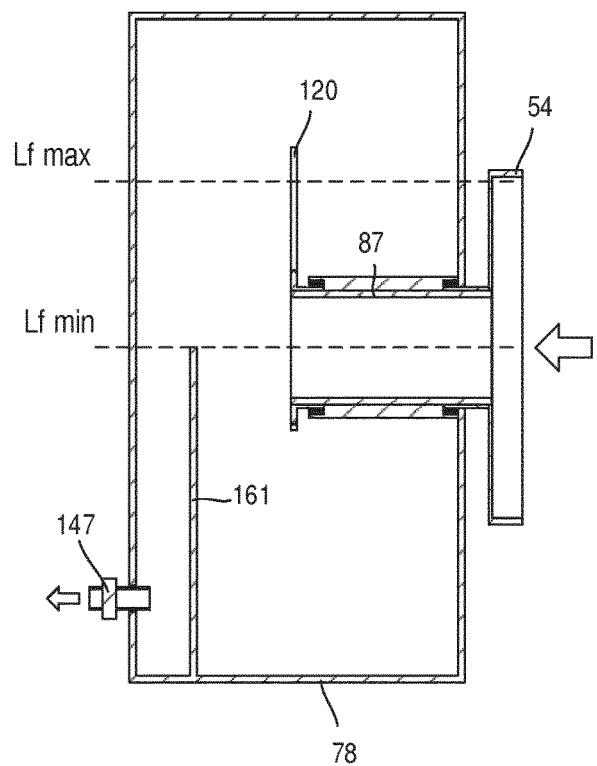
FIG. 43 illustrates a first output arrangement of a filtering machine comprising a weir and a valve.

Referring in particular to FIG. 43, in a first modified arrangement, the filtrate level Lf may be controlled using an internal weir 161 (or "wall") in the reservoir 78. The level of the filtrate Lf crossing the weir increases marginally at higher flowrates.

Figure 44:
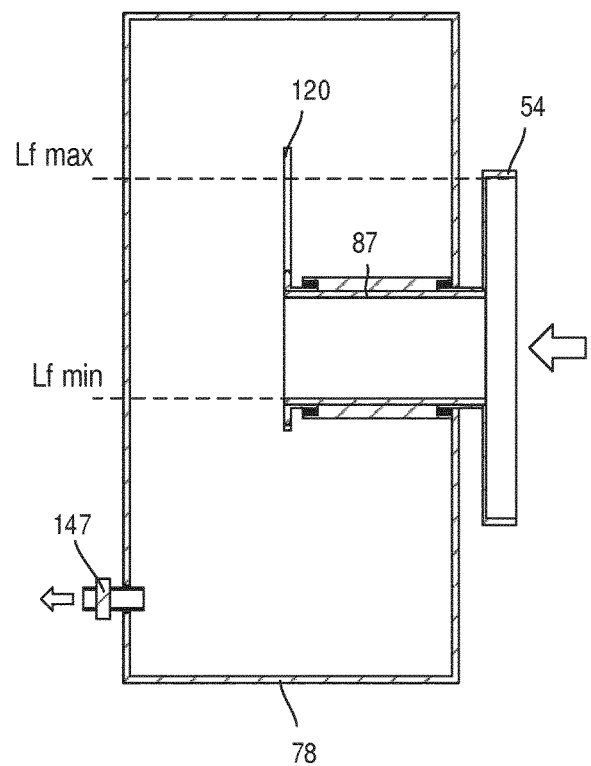
FIG. 44 illustrates a second output arrangement of a filtering machine comprising a valve without a weir.

Referring in particular to FIG. 44, in a second modified arrangement, the filtrate level Lf may be controlled using the valve 147 which may be in the form of a proportionate flow valve.

The level of the filtrate can then be controlled using a pump which pumps the filtrate out of the reservoir 78 to a desired level.

Figure 45:
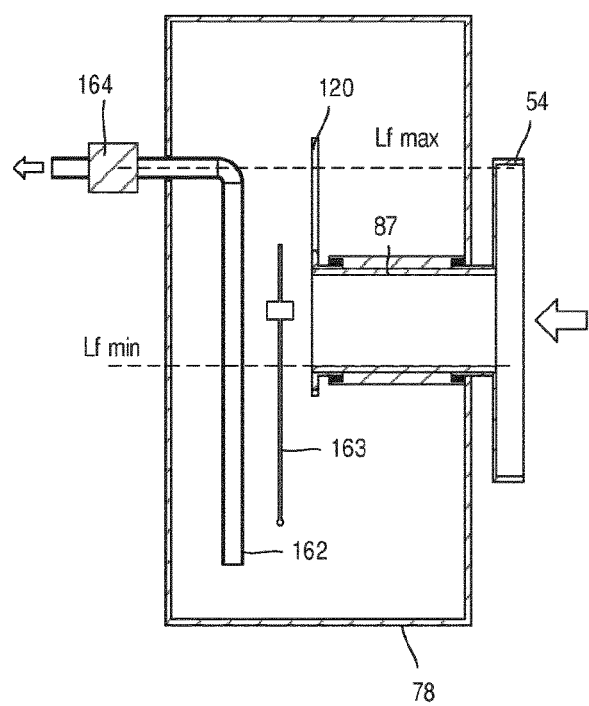
FIG. 45 illustrates a third output arrangement of a filtering machine comprising a suction pump.

Referring in particular to FIG. 45, in a third modified arrangement, the filtrate level Lf may be controlled using a suction tube 162 which depends from a suction pump 164. The filtrate level Lf may be sensed using a level sensor 163.

Figure 46:
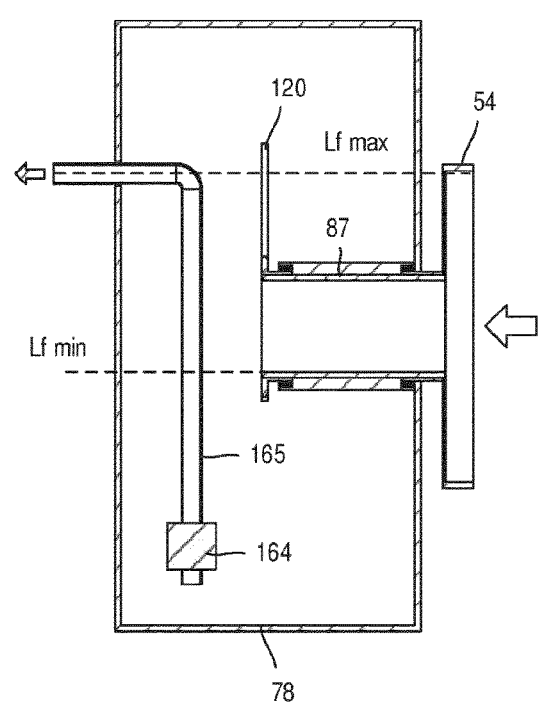
FIG. 46 illustrates a fourth output arrangement of a filtering machine comprising a submersible pump.

Referring in particular to FIG. 46, in a fourth modified arrangement, the filtrate level Lf may be controlled using a submersible pump 164 which pumps filtrate to a higher level via tube 165. A level sensor (not shown) may be used.

Figure 47:
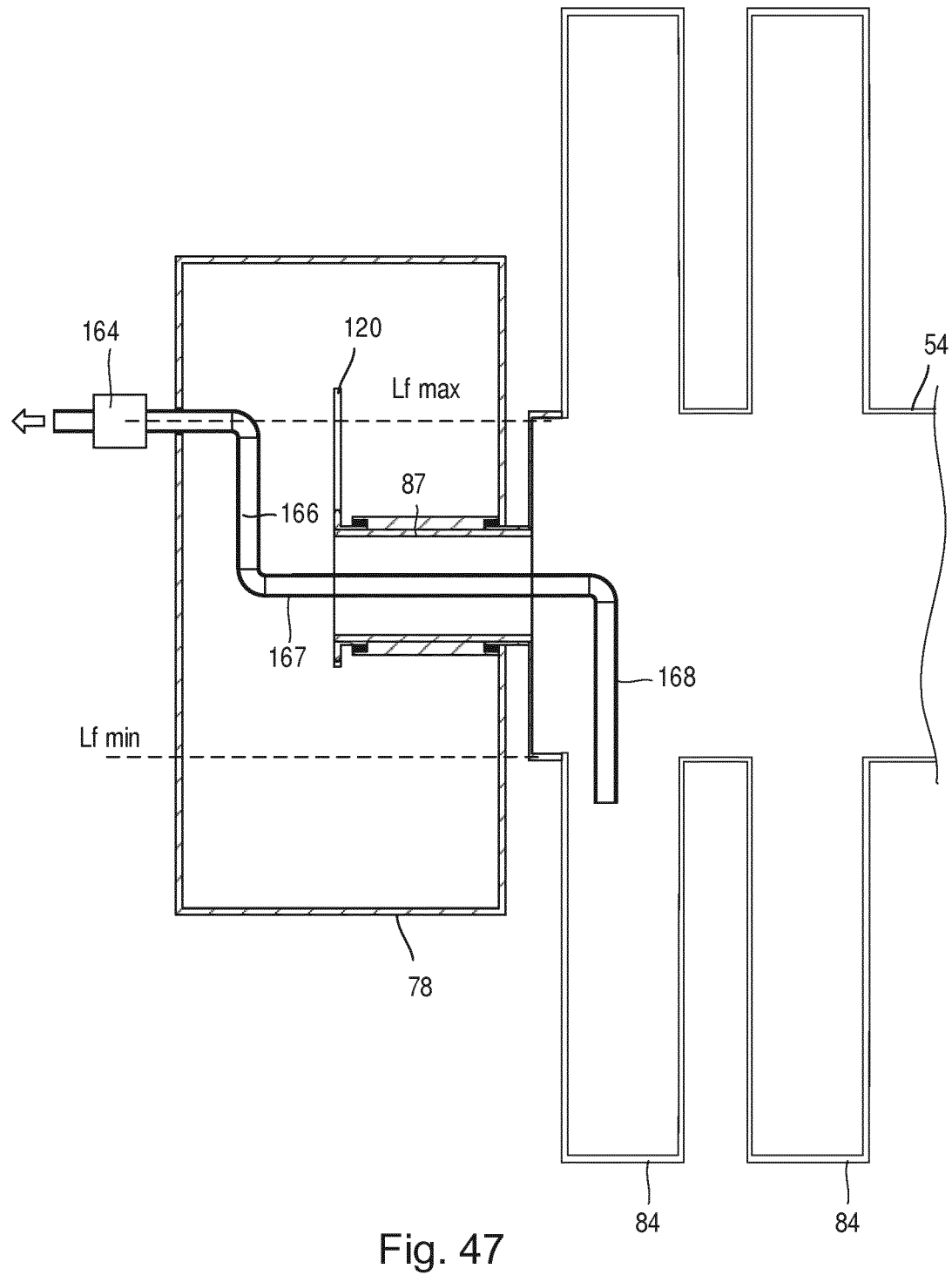
FIG. 47 illustrates a fifth output arrangement of a filtering machine comprising a suction pump and a depending pipe.

Referring in particular to FIG. 47, in a fifth modified arrangement, the filtrate level Lf may be controlled using a stepped suction tube arrangement 166, 167, 168 which depends from a suction pump 164. The stepped suction tube arrangement 166, 167, 168 extends into the internal compartment 84, below the bottom of the cylindrical portion 54. A level sensor (not shown) may be used.

Thus, the height Lf of the filtrate may be variably adjusted to improve the performance of the filtering machine 8 by controlling the height difference, A, (and hence the pressure difference) across the filter element 9, with or without controlling the to-be-filtered level, L.

Experimental Results

Tables I, II, III and IV show results of using the filtering machine under different operating conditions.

In the tables, columns A to K are as follows:
- A is the pressure difference between the input and out of the machine, expressed in cmH2O (corresponding to the height difference, Δ)
- B is the flow rate at the output of the machine, expressed in m³/h
- C is the flux, expressed in L/m². It is the flow rate (column B) divided by the active surface area of the machine (column H) and converted from cubic meters to litres.
- D is frequency of the controller, expressed as a %, where 100%=0.66 rpm at 50 Hz.
- E is the flow rate of air in the container, in m³/h at normal conditions.
- F is water pressure in the backwash pipes, in bar (=1 kPa).
- G is flow rate of air in the membrane bioreactor, in m³/h at normal conditions.
- H is the active area of filtering material, i.e. surface area of filter material immersed in water, in m². It corresponds to the surface area of a machine with four discs each having a diameter of 1700 mm, immersed up to their axis of rotation.
- I is suspended solids, in mg/L.
- J is turbidity at the output of the machine, in mg/L.
- K is electric power absorbed by the machine, in kW.

TABLE I

| A | B | C | D | E | F | G | H | I | J | K |
|---|---|---|---|---|---|---|---|---|---|---|
| 1 | 8.0 | 1000 | 50 | 110 | 4.7 | 0 | 8 | 13,000 | 2 | 1.3 |
| 2 | 8.5 | 1063 | 50 | 110 | 4.7 | 0 | 8 | 13,000 | 2 | 1.3 |
| 3 | 12.0 | 1500 | 50 | 110 | 4.7 | 0 | 8 | 13,000 | 2 | 1.3 |
| 4 | 12.3 | 1538 | 50 | 110 | 4.7 | 0 | 8 | 13,000 | 2 | 1.3 |

TABLE I-continued

| A | B | C | D | E | F | G | H | I | J | K |
|---|---|---|---|---|---|---|---|---|---|---|
| 5 | 12.5 | 1563 | 50 | 110 | 4.7 | 0 | 8 | 13,000 | 2 | 1.3 |
| 6 | 12.8 | 1600 | 50 | 110 | 4.7 | 0 | 8 | 13,000 | 2 | 1.3 |
| 7 | 13.0 | 1625 | 50 | 110 | 4.7 | 0 | 8 | 13,000 | 2 | 1.3 |
| 8 | 13.5 | 1688 | 50 | 110 | 4.7 | 0 | 8 | 13,000 | 2 | 1.3 |
| 9 | 14.0 | 1750 | 50 | 110 | 4.7 | 0 | 8 | 13,000 | 2 | 1.3 |
| 10 | 14.5 | 1813 | 50 | 110 | 4.7 | 0 | 8 | 13,000 | 2 | 1.3 |
| 11 | 15.0 | 1875 | 50 | 110 | 4.7 | 0 | 8 | 13,000 | 2 | 1.3 |
| 12 | 15.5 | 1938 | 50 | 110 | 4.7 | 0 | 8 | 13,000 | 2 | 1.3 |

TABLE II

| A | B | C | D | E | F | G | H | I | J | K |
|---|---|---|---|---|---|---|---|---|---|---|
| 1 | 8.0 | 1000 | 100 | 110 | 4.7 | 0 | 8 | 13,000 | 2 | 1.25 |
| 2 | 8.5 | 1063 | 100 | 110 | 4.7 | 0 | 8 | 13,000 | 2 | 1.25 |
| 3 | 8.8 | 1100 | 100 | 110 | 4.7 | 0 | 8 | 13,000 | 2 | 1.25 |
| 4 | 9.0 | 1125 | 100 | 110 | 4.7 | 0 | 8 | 13,000 | 2 | 1.25 |
| 5 | 9.5 | 1188 | 100 | 110 | 4.7 | 0 | 8 | 13,000 | 2 | 1.25 |
| 6 | 10.0 | 1250 | 100 | 110 | 4.7 | 0 | 8 | 13,000 | 2 | 1.25 |
| 7 | 11.0 | 1375 | 100 | 110 | 4.7 | 0 | 8 | 13,000 | 2 | 1.25 |
| 8 | 12.0 | 1500 | 100 | 110 | 4.7 | 0 | 8 | 13,000 | 2 | 1.25 |
| 9 | 12.5 | 1563 | 100 | 110 | 4.7 | 0 | 8 | 13,000 | 2 | 1.25 |
| 10 | 13.0 | 1625 | 100 | 110 | 4.7 | 0 | 8 | 13,000 | 2 | 1.25 |
| 11 | 14.0 | 1750 | 100 | 110 | 4.7 | 0 | 8 | 13,000 | 2 | 1.25 |
| 12 | 15.0 | 1875 | 100 | 110 | 4.7 | 0 | 8 | 13,000 | 2 | 1.25 |

TABLE III

| A | B | C | D | E | F | G | H | I | J | K |
|---|---|---|---|---|---|---|---|---|---|---|
| 1 | 8.5 | 1063 | 50 | 110 | 4.7 | 80 | 8 | 13,000 | 2 | 2.5 |
| 2 | 12.0 | 1500 | 50 | 110 | 4.7 | 80 | 8 | 13,000 | 2 | 2.5 |
| 3 | 13.0 | 1625 | 50 | 110 | 4.7 | 80 | 8 | 13,000 | 2 | 2.5 |
| 4 | 15.0 | 1875 | 50 | 110 | 4.7 | 80 | 8 | 13,000 | 2 | 2.5 |
| 5 | 15.5 | 1938 | 50 | 110 | 4.7 | 80 | 8 | 13,000 | 2 | 2.5 |
| 6 | 16.0 | 2000 | 50 | 110 | 4.7 | 80 | 8 | 13,000 | 2 | 2.5 |
| 7 | 16.5 | 2063 | 50 | 110 | 4.7 | 80 | 8 | 13,000 | 2 | 2.5 |
| 8 | 17.0 | 2125 | 50 | 110 | 4.7 | 80 | 8 | 13,000 | 2 | 2.5 |
| 9 | 17.5 | 2188 | 50 | 110 | 4.7 | 80 | 8 | 13,000 | 2 | 2.5 |
| 10 | 18.0 | 2250 | 50 | 110 | 4.7 | 80 | 8 | 13,000 | 2 | 2.5 |
| 11 | 18.5 | 2313 | 50 | 110 | 4.7 | 80 | 8 | 13,000 | 2 | 2.5 |
| 12 | 19.0 | 2375 | 50 | 110 | 4.7 | 80 | 8 | 13,000 | 2 | 2.5 |

TABLE IV

| A | B | C | D | E | F | G | H | I | J | K |
|---|---|---|---|---|---|---|---|---|---|---|
| 1 | 10.0 | 1250 | 100 | 110 | 4.7 | 80 | 8 | 13,000 | 2 | 2.5 |
| 2 | 12.0 | 1500 | 100 | 110 | 4.7 | 80 | 8 | 13,000 | 2 | 2.5 |
| 3 | 12.3 | 1538 | 100 | 110 | 4.7 | 80 | 8 | 13,000 | 2 | 2.5 |
| 4 | 12.6 | 1575 | 100 | 110 | 4.7 | 80 | 8 | 13,000 | 2 | 2.5 |
| 5 | 12.8 | 1600 | 100 | 110 | 4.7 | 80 | 8 | 13,000 | 2 | 2.5 |
| 6 | 13.0 | 1625 | 100 | 110 | 4.7 | 80 | 8 | 13,000 | 2 | 2.5 |
| 7 | 14.0 | 1750 | 100 | 110 | 4.7 | 80 | 8 | 13,000 | 2 | 2.5 |
| 8 | 15.0 | 1875 | 100 | 110 | 4.7 | 80 | 8 | 13,000 | 2 | 2.5 |
| 9 | 16.5 | 2063 | 100 | 110 | 4.7 | 80 | 8 | 13,000 | 2 | 2.5 |
| 10 | 18.0 | 2250 | 100 | 110 | 4.7 | 80 | 8 | 13,000 | 2 | 2.5 |
| 11 | 19.0 | 2375 | 100 | 110 | 4.7 | 80 | 8 | 13,000 | 2 | 2.5 |
| 12 | 20.0 | 2500 | 100 | 110 | 4.7 | 80 | 8 | 13,000 | 2 | 2.5 |

Modifications

It will be appreciated that various modifications may be made to the embodiments hereinbefore described. Such modifications may involve equivalent and other features which are already known in the design, manufacture and use of filtering machines and component parts thereof and which may be used instead of or in addition to features already described herein. Features of one embodiment may be replaced or supplemented by features of another embodiment.

Although the preceding description has referred to the rotating disc filter as being intended for the treatment of wastewater, it should be understood that other liquids may also be treated, and evidently the washing and backwashing are to be carried out with the filtered liquid.

The filter can act as a thickener. Extracting filtered liquid from the vessel containing a mixture of liquid and solid or semi-solid substances has the effect of increasing the concentration of these substances in the vessel.

Although claims have been formulated in this application to particular combinations of features, it should be understood that the scope of the disclosure of the present invention also includes any novel features or any novel combination of features disclosed herein either explicitly or implicitly or any generalization thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

The invention claimed is:

1. Apparatus comprising:
   a liquid-permeable filtering element having first and second faces, the liquid-permeable filtering element movable into at least partial submersion in a liquid, the liquid-permeable filtering element configured for cyclical movement through the liquid such that:
      when moved into a first position, an area of the first face of the liquid-permeable filtering element is subject to liquid under pressure and a pressure difference across the liquid-permeable filtering element is greater than 0 and less than or equal to 5.9 kPa; and
      when moved into a second position, the area is not subjected to liquid under pressure or is subjected to liquid at a lower pressure difference,
   at least one nozzle for directing at least one jet at the second face of the liquid-permeable filtering element through the liquid-permeable filtering element towards the first face of the liquid-permeable filtering element for removing and/or aiding removal of solids accumulated on the first face of the liquid-permeable filtering element;
   wherein
   the liquid-permeable filtering element has a pore size between 2 and 40 μm; and
   the apparatus further comprises:
   at least one gas feeder for introducing gas bubbles into the liquid during filtration by the liquid-permeable filtering element with the gas feeder positioned below the liquid-permeable filtering element in the first position so that when the liquid-permeable filtering element is in the first position and the gas feeder is introducing gas bubbles, the gas bubbles create turbulent motion along the first face of the liquid-permeable filtering element.

2. The apparatus of claim 1, wherein the pore size is between 15 to 25 μm.

3. The apparatus of claim 1, wherein the liquid-permeable filtering element comprises a mesh.

4. The apparatus of claim 1, configured such that, in the second position, the area is above the liquid.

5. The apparatus of claim 1, further comprising:
   a container for the liquid up to a level for operation.

6. The apparatus of claim 1, wherein the liquid is wastewater.

7. The apparatus according to claim 1, further comprising means configured to sustain a height difference between a level of the liquid facing the first face and a filtrate level of the filtered liquid across the liquid-permeable filtering element so as to control the pressure across the liquid-permeable filtering element.

8. The apparatus according to claim 7, wherein the means configured to sustain the height difference between the liquid and the filtered liquid across the liquid-permeable filtering element is selected from a group consisting of:
   a pipe configured to serve as a weir for the filtered liquid;
   a wall configured to serve as a weir for the filtered liquid;
   a proportionate flow valve configured to release filtered liquid to control the filtrate level;
   a pump configured to pump out the filtered liquid to control the filtrate level;
   a submersible pump configured to pump out the filtered liquid to control the filtrate level; and
   a stepped suction tube arrangement which depends from a suction pump to control the filtrate level.

9. The apparatus according to claim 1, further comprising a motor configured to drive the cyclical movement of the liquid-permeable filtering element via a transmission.

10. A method comprising filtering a liquid having total suspended solids of between 1 and 50 g/L using a liquid-permeable filtering element having first and second faces so as to produce filtered liquid having total suspended solids of no more than 10 mg/L, wherein the liquid-permeable filtering element is movable into at least partial submersion in the liquid and the liquid-permeable filtering element is configured for cyclical movement through the liquid, the method further comprising:
   cyclically moving the liquid-permeable filtering element through the liquid whereby:
      when moved into a first position, an area of the first face of the filtering element is subjected to liquid under pressure and a pressure difference across the liquid-permeable filtering element is greater than 0 and less than or equal to 5.9 kPa, and
      when moved into a second position, the area is not subjected to liquid under pressure or is subjected to liquid at a lower pressure difference, and solids accumulated on the first face of the filtering element are removable by directing at least one jet at the second face of the liquid-permeable filtering element through the liquid-permeable filtering element towards the first face of the liquid-permeable filtering element;
   wherein
   the liquid-permeable filtering element has a pore size between 2 and 40 μm; and the method further comprising:
   introducing gas bubbles into the liquid using a gas feeder positioned below the liquid-permeable filtering element in the first position so that when the liquid-permeable filtering element is in the first position and the gas feeder is introducing gas bubbles, the gas bubbles create turbulent motion along the first face of the liquid-permeable filtering element.

11. The method of claim 10, wherein
said cyclical movement of the liquid-permeable filtering element is such that permeation flux is between 200 L/(m²h) to 5,000 L/(m²h); the method further comprising
removing the solids accumulated on the first face of the liquid-permeable filtering element, the solids accumulated on the first face of the liquid-permeable filtering element having a thickness greater than 0 and less than or equal to 6 cm.

12. The method of claim 10, wherein the pore size is between 15 to 25 µm.

13. The method of claim 10, wherein the liquid-permeable filtering element is a disc that rotates at a speed greater than 0 rpm and less than 10 rpm.

14. The method of claim 10, wherein between 50 to 75% of the area of the liquid-permeable filtering element is submerged in the liquid.

15. The method of claim 10, wherein the accumulated solids are removed periodically.

16. The method of claim 10, comprising:
causing a height difference between the liquid and the filtered liquid across the liquid-permeable filtering element so as to control the pressure across the liquid-permeable filtering element.

17. The method according to claim 16, wherein the height difference between the liquid and the filtered liquid across the liquid-permeable filtering element is caused by means configured to sustain the height difference and selected from a group consisting of:
a pipe configured to serve as a weir for the filtered liquid;
a wall configured to serve as a weir for the filtered liquid;
a proportionate flow valve configured to release filtered liquid to control a filtrate level of the filtered liquid;
a pump configured to pump out the filtered liquid to control the filtrate level;
a submersible pump configured to pump out the filtered liquid to control the filtrate level; and
a stepped suction tube arrangement which depends from a suction pump to control the filtrate level.

18. The method of claim 10, wherein, in the second position, the area is above the liquid.

19. The method according to claim 10, wherein the cyclical movement of the liquid-permeable filtering element is driven by a motor via a transmission.

20. Apparatus comprising:
a liquid-permeable filtering element having first and second faces, the liquid-permeable filtering element movable into at least partial submersion in a liquid, the liquid-permeable filtering element configured for cyclical movement through the liquid such that:
when moved into a first position, an area of the first face of the liquid-permeable filtering element is subject to liquid under pressure and a pressure difference across the liquid-permeable filtering element is greater than 0 and less than or equal to 5.9 kPa; and
when moved into a second position, the area is not subjected to liquid under pressure or is subjected to liquid at a lower pressure difference,
at least one nozzle for directing at least one jet at the second face of the liquid-permeable filtering element through the liquid permeable filtering element towards the first face of the liquid-permeable filtering element for removing and/or aiding removal of solids accumulated on the first face of the liquid-permeable filtering element;
wherein
the liquid-permeable filtering element includes pores having a range of different pore sizes, the pore sizes being between 2 and 40 µm; and
the apparatus further comprises:
at least one gas feeder for introducing gas bubbles into the liquid during filtration by the liquid-permeable filtering element with the gas feeder positioned below the first position so that when the liquid-permeable filtering element is in the first position and the gas feeder is introducing gas bubbles, the gas bubbles create turbulent motion along the first face of the liquid-permeable filtering element.

21. Apparatus according to claim 20, further comprising means configured to sustain a height difference between a level of the liquid and a filtrate level of the filtered liquid across the liquid-permeable filtering element so as to control the pressure across the liquid-permeable filtering element.

22. Apparatus according to claim 21, wherein the means configured to sustain the height difference between the liquid and the filtered liquid across the liquid-permeable filtering element are selected from a group consisting of:
a pipe configured to serve as a weir for the filtered liquid;
a wall configured to serve as a weir for the filtered liquid;
a proportionate flow valve configured to release filtered liquid to control the filtrate level;
a pump configured to pump out the filtered liquid to control the filtrate level;
a submersible pump configured to pump out the filtered liquid to control the filtrate level; and
a stepped suction tube arrangement which depends from a suction pump to control the filtrate level.

23. The apparatus according to claim 20, further comprising a motor configured to drive the cyclical movement of the liquid-permeable filtering element via a transmission.

* * * * *